US011363608B2

(12) United States Patent
Niu et al.

(10) Patent No.: US 11,363,608 B2
(45) Date of Patent: Jun. 14, 2022

(54) UNLICENSED NARROWBAND INTERNET OF THINGS CONTROL CHANNEL COMMUNICATION

(71) Applicant: APPLE INC., Cupertino, CA (US)

(72) Inventors: Huaning Niu, San Jose, CA (US); Wenting Chang, Beijing (CN); Anthony Sautung Lee, San Diego, CA (US); Rongrong Sun, Beijing (CN); Salvatore Talarico, Sunnyvale, CA (US); Qiaoyang Ye, Fremont, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 16/638,384

(22) PCT Filed: Aug. 8, 2018

(86) PCT No.: PCT/US2018/045728
§ 371 (c)(1),
(2) Date: Feb. 11, 2020

(87) PCT Pub. No.: WO2019/032653
PCT Pub. Date: Feb. 14, 2019

(65) Prior Publication Data
US 2021/0136769 A1    May 6, 2021

Related U.S. Application Data

(60) Provisional application No. 62/658,990, filed on Apr. 17, 2018.

(30) Foreign Application Priority Data

Aug. 11, 2017  (WO) ................ PCT/CN2017/097121

(51) Int. Cl.
*H04W 4/00* (2018.01)
*H04W 72/04* (2009.01)
(Continued)

(52) U.S. Cl.
CPC ....... *H04W 72/0493* (2013.01); *H04L 5/0048* (2013.01); *H04L 5/0055* (2013.01);
(Continued)

(58) Field of Classification Search
CPC . H04W 72/0493; H04W 4/80; H04W 72/042; H04W 72/0446; H04W 72/0453;
(Continued)

(56) References Cited

U.S. PATENT DOCUMENTS

2017/0181135 A1* 6/2017 Chen ...................... H04L 5/0092
2018/0317234 A1* 11/2018 Lindoff ............... H04W 72/042
2019/0159178 A1* 5/2019 Tang .................. H04L 27/2602

FOREIGN PATENT DOCUMENTS

EP        3182634 A1    12/2016
WO    2016144140 A1     9/2016
(Continued)

OTHER PUBLICATIONS

3GPP TS 36.211 V14.3.0, '3GPP ; TSGRAN ; E-UTRA; Physical channels and modulation (Release 14)', Jun. 23, 2017.
(Continued)

*Primary Examiner* — Mang Hang Yeung
(74) *Attorney, Agent, or Firm* — Eschweiler & Potashnik, LLC

(57) ABSTRACT

In embodiments, a base station may be able to identify whether a user equipment (UE) is to operate within the cellular network in accordance with a wideband (WB) protocol or a narrowband (NB) protocol. Based on this identification, the base station may further be able to identify a number of resource blocks (RBs) that include subcarriers occupied by enhanced narrowband control channel elements (eNCCEs). Finally, the base station may be able to transmit the eNCCEs on the subcarriers. Other embodiments may be described and/or claimed.

16 Claims, 13 Drawing Sheets

(51) Int. Cl.
*H04W 4/80* (2018.01)
*H04L 5/00* (2006.01)

(52) U.S. Cl.
CPC ........... *H04W 4/80* (2018.02); *H04W 72/042* (2013.01); *H04W 72/0446* (2013.01); *H04W 72/0453* (2013.01)

(58) Field of Classification Search
CPC ... H04L 5/0048; H04L 5/0055; H04L 5/0053; H04L 5/0007; H04L 5/0051
USPC ....................................................... 370/329
See application file for complete search history.

(56) References Cited

FOREIGN PATENT DOCUMENTS

| | | |
|---|---|---|
| WO | 2017/019133 A1 | 2/2017 |
| WO | 2017/057870 A1 | 4/2017 |
| WO | 2017/079574 A1 | 5/2017 |

OTHER PUBLICATIONS

International Search Report dated Nov. 30, 2018 for International Application No. PCT/US2018/045728.
Supplementary European Search Report dated Mar. 11, 2021 in connection with EP Application No. EP18843316.

* cited by examiner

UNLICENSED NARROWBAND INTERNET OF THINGS CONTROL CHANNEL COMMUNICATION

CROSS-REFERENCE TO RELATED APPLICATION

This application is a National Phase entry application of International Patent Application No. PCT/US2018/045728 filed Aug. 8, 2018, which claims priority to International Patent Application PCT/CN2017/097121, filed Aug. 11, 2017, under the Patent Cooperation Treaty, and further claims the benefit of U.S. Provisional Application No. 62/658,990, filed Apr. 17, 2018, the subject matter of which is hereby incorporated by reference in its entirety.

BACKGROUND

The third-generation partnership project (3GPP) has standardized two designs to support internet of things (IoT) services, namely enhanced Machine Type Communication (eMTC) and NarrowBand IoT (NB-IoT). As eMTC and NB-IoT user equipments (UEs) may be deployed in huge numbers, lowering the cost of these UEs may help enable implementation of IoT. Also, low power consumption by the UEs may be desirable to extend the life time of the battery. In addition, there are substantial use cases of devices deployed deep inside buildings, which may require coverage enhancement in comparison to the defined long-term evolution (LTE) cell coverage footprint. In summary, eMTC and NB-IoT techniques may help ensure that the UEs have low cost, low power consumption, and enhanced coverage.

However, in the industrial IoT applications, the UE requirements may be divergent. Some devices may have the cost limitation with low data rate, and low latency, some devices may have a relative high data rate requirement with tolerable cost consideration. In order to support these divergent devices with divergent service, a work item with hybrid licensed narrow band Internet of Thing (IoT) is agreed.

Generally, both eMTC and NB-IoT operate in the licensed frequency spectrum. On the other hand, the scarcity of the licensed spectrum in the low frequency band results in a deficit in the data rate boost. Thus, there are emerging interests in the operation of LTE systems in the unlicensed frequency spectrum.

Potential LTE operation in the unlicensed frequency spectrum includes, but is not limited to the Carrier Aggregation based on licensed assisted access (LAA)/enhanced LAA (eLAA) systems, LTE operation in the unlicensed spectrum via dual connectivity (DC), and the standalone LTE system in the unlicensed spectrum where LTE-based technology solely operates in unlicensed spectrum without requiring an "anchor" in licensed spectrum. This standalone operation in the unlicensed frequency spectrum may be referred to as MulteFire.

Generally, the target band for NB unlicensed IoT is the sub-1 gigahertz (GHz) band many regulatory jurisdictions. Regulation may define the operation of such a system for either digital modulation or frequency hopping (FH). Digital modulation may require system bandwidth greater than 500 kilohertz (KHz) with a power spectral density (PSD) limitation of 8 decibel-milliwatts (dBm) per 3 KHz; while frequency hopping may instead have limitations on the duty cycle and the number of hops. Different number of hops result in different max transmission power. In the European union (EU), four new sub-channels have been proposed to be used for this specific band. These sub-channels are: 865.6 megahertz (MHz) ~865.8 MHz, 866.2 MHz~866.4 MHz, 866.8 MHz~867.0 MHz, and 867.4 MHz~867.6 MHz. In the EU, the regulation regarding these sub-channels states that: 1) maximum equivalent isotropically radiated power (EIRP) is 27 dBm; 2) adaptive power control is required; 3) bandwidth should be smaller than 200 kHz; and 4) the duty cycle for network access points is smaller than 10%, otherwise the duty cycle should be 2.5% for other types of equipments. While operating a NB-IoT system in this band as a digital modulation system is appealing, operating as a FH system provides more benefits: frequency diversity is exploited by operating the system as FH system, while the initial access timing might be longer. More importantly, digital modulation with 3 resource blocks (RB) may have the same transmission power as FH with 1 RB, which translates in a loss in terms of coverage of about ~5 dB.

DETAILED DESCRIPTION

Figure 1:
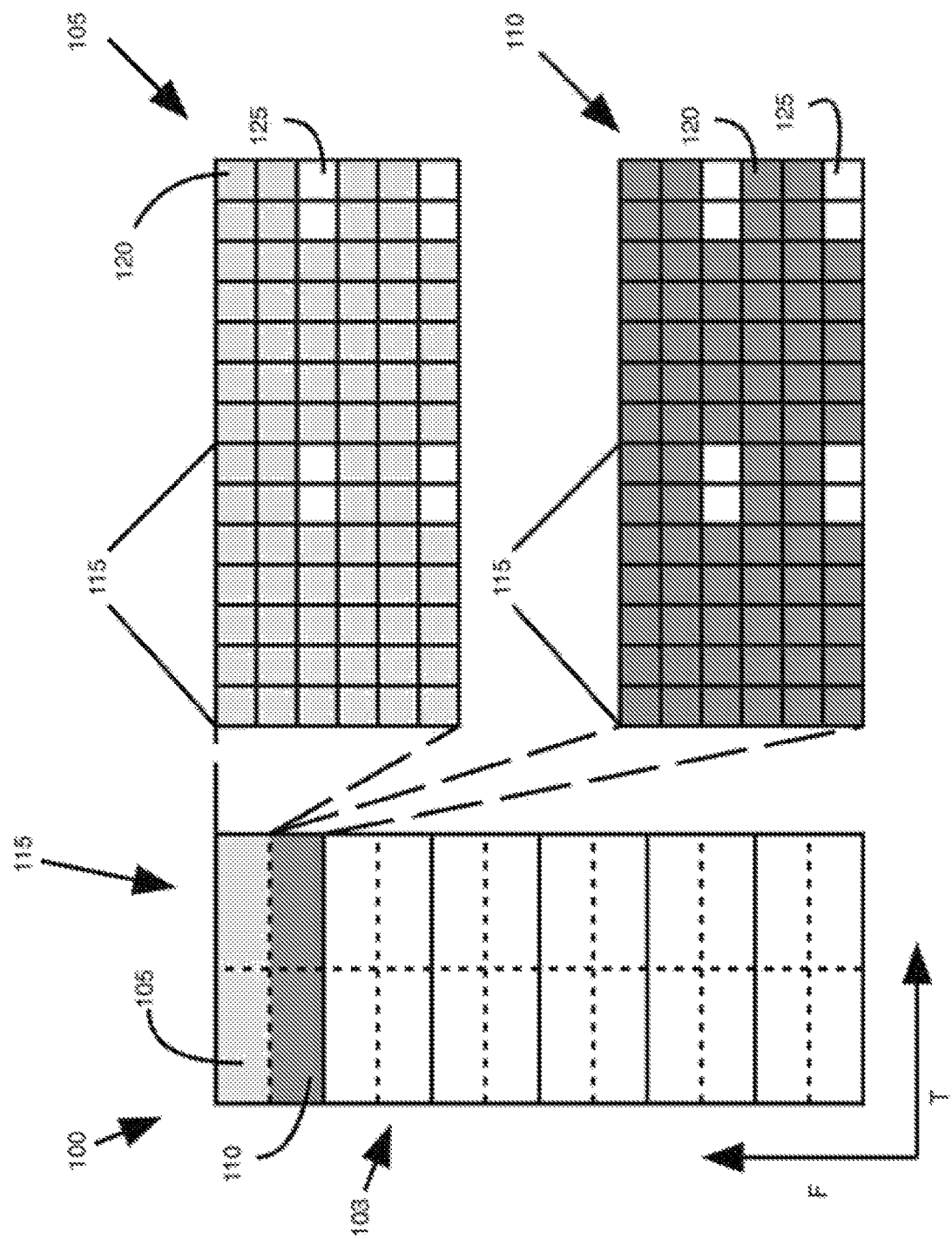
FIG. 1 depicts a subframe that includes one or more enhanced narrowband control channel elements (eNCCEs), in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature formed, deposited, or otherwise disposed on a second feature," may mean that the first feature is formed, deposited, or disposed over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an application specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise.

Generally, some embodiments herein may relate to design co-existence between low cost UEs with narrow bandwidth capability and UEs with wide bandwidth capability in one system. Specifically, the channel design including the initial access procedure and channel bandwidth may be discussed herein. Other embodiments may relate to UE capability reporting, which is related to UE's bandwidth capability, soft buffer capability, etc. These embodiments may enable design of the physical downlink control channel for UEs with different bandwidth capability.

Embodiments may also relate to the design of downlink control information (DCI) for downlink and uplink scheduling for unlicensed NB-IOT system. In these embodiments, the described DCI and search space design for unlicensed NB-IOT systems may operate as, and include the advantages of, a FH system.

Downlink Control Channel Design Based on Narrowband Physical Downlink Control Channel (NPDCCH)

In legacy downlink control channel structures for the NB-IoT system, two narrowband control channel elements (NCCEs) may be contained within a single resource block (RB).

In one embodiment herein, the physical channel for a UE with wide bandwidth capability may be realized by enlarging the NCCEs to an increased number of RBs. These enlarged NCCEs may be referred to herein as an eNCCE. An example of the eNCCE is illustrated in FIGS. 1 and 2.

Figure 2:
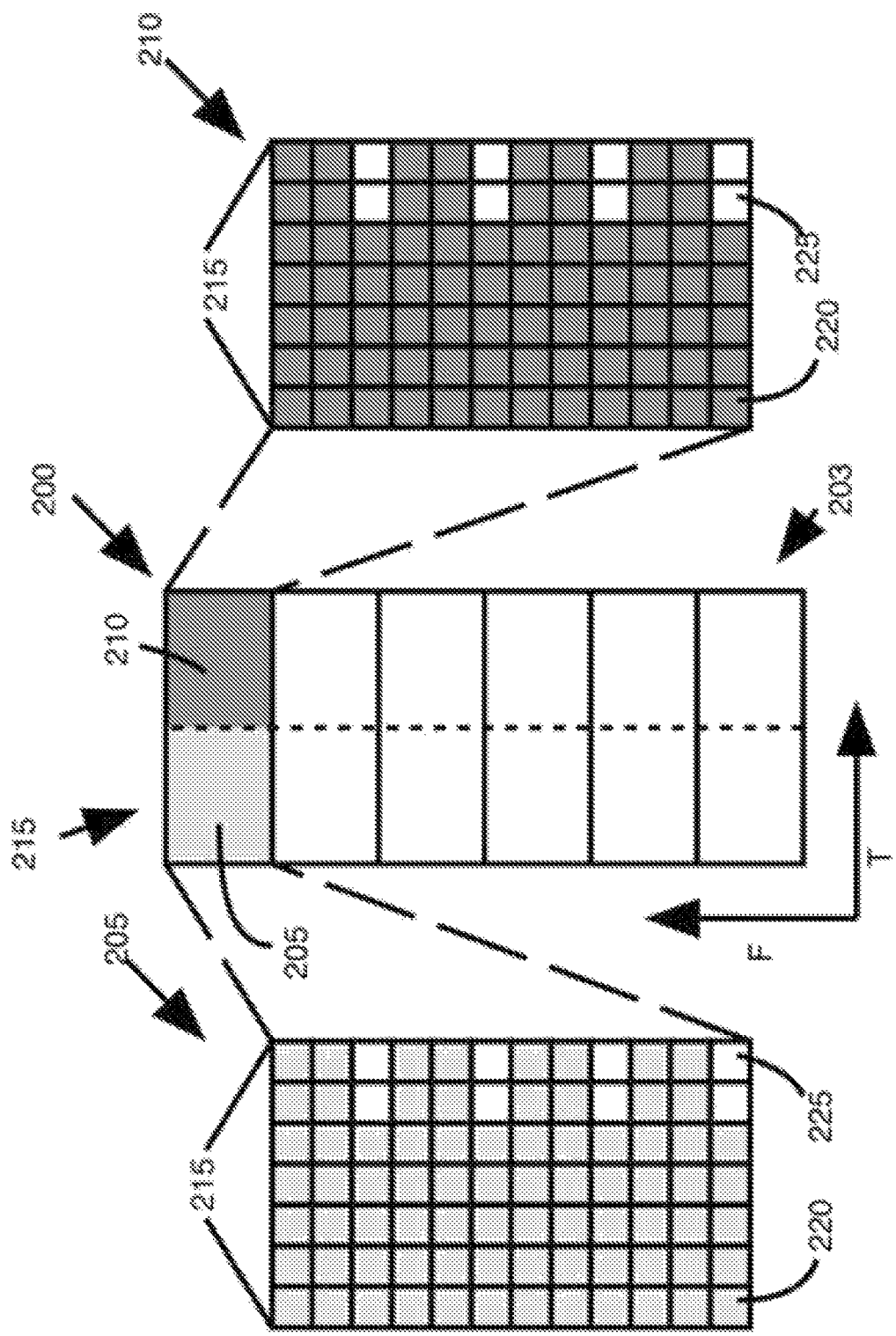
FIG. 2 depicts an alternative configuration of a subframe that includes one or more eNCCEs, in accordance with various embodiments.

Generally, in reference to FIGS. 1 and 2, for a UE with NB capability, the physical resource block (PRB) carrier index for the enhanced NPDCCH (eNPDCCH) may be configured by the base station through higher layer signaling. Specifically, a base station in the cellular network such as an evolved nodeB (eNB) may transmit one or more indications to a UE that is configured to operate in accordance with the NB protocol in the cellular network. The indications may be transmitted via higher layer signaling. The UE may then be able to use those indications to identify information related to the eNPDCCH such as the PRB configuration or the carrier index of subcarriers on which the eNPDCCH will be transmitted.

Further, for a UE configured to operate in accordance with a WB protocol in the cellular network, multiple search candidates may span the available bandwidth. More specifically, multiple search candidates may span the available bandwidth, and the base station may then have the flexibility to assign different UEs at the location(s) of different ones of the candidates.

As used herein, the term "WB" refers to operation wherein the eNPDCCH is transmitted on more than one RB. For example, when the UE is operating in accordance with a WB protocol, the eNPDCCH may be transmitted on subcarriers of six RBs. By contrast, the term "NB" refers to operation wherein the eNPDCCH is transmitted on subcarriers of a single RB.

More generally, as shown in FIGS. 1 and 2, one eNCCE may be composed of six consecutive subcarriers spanning 14 orthogonal frequency division multiplexed (OFDM) symbols. Alternatively, in some embodiments one eNCCE may be composed of 12 consecutive subcarriers spanning 7 OFDM symbols.

Specifically, FIG. 1 depicts a subframe 100. The subframe may be organized along the frequency axis (F) and the time axis (T). A unit along the frequency axis F may be referred to as a subcarrier. A unit along the time axis T may be referred to as a symbol. A resource element (RE) 120 may refer to a unit that is a single subcarrier at a single symbol.

Generally, the subframe 100 may be formed of six RBs 103, each of which may include 12 subcarriers. Further, the subframe may span two time slots 115, each of which may include 7 symbols.

An RB 103 may include two eNCCEs such as eNCCEs 105 and 110. As shown in FIG. 1, each eNCCE 105 and 110 may include 14 symbols along the time axis T and six subcarriers along the frequency axis F. Generally, the eNCCEs 105 and 110 may additionally include control elements such as control elements 125. The control elements 125 may be, for example reference signals that help a receiver locate a given subframe 100, time slot 115, or eNCCE 105 or 110. Alternatively, the control elements 125 may include a guard element or other information that may be used by a receiver in other ways.

FIG. 2 depicts an alternative configuration of a subframe 200. Similarly to subframe 100, subframe 200 may be organized along the frequency axis (F) and the time axis (T), and a unit of the subframe may be referred to as a RE 220. Subframe 200 may be made up of six RBs 203 and may span two time slots 215. Each RB 203 may include 12 subcarriers and 14 symbols. Similarly to RB 103, each RB 203 may include two eNCCEs 205 and 210. However, in subframe 200, the eNCCEs may be split within an RB 203 along the time axis T rather than the frequency axis F. Specifically, each eNCCE 205 and 210 may by composed of six symbols and 12 subcarriers. Similarly to eNCCEs 105 and 110, eNCCEs 205 and 210 may include one or more control elements 125 at specified REs within the eNCCEs 105 and 110.

In one embodiment, the aggregation level (AL) of an eNCCE may be increased beyond 2. That is, subcarriers of more than 2 eNCCEs may be used to transmit information related to the eNPDCCH. Taking a subframe with six RBs as an example, the AL for transmission of physical downlink control information such as information that may be transmitted via the eNPDCCH may take values of 4, 5, 6, 7, 8, 9, 10, 11, or 12.

In one embodiment, the eNCCEs may be aggregated in the distributed manner, e.g. {0, 11} for AL=2, {0, 3, 6, 9} for AL=4, etc. Additionally or alternatively, the eNCCEs may be aggregated in the localized manner, e.g. {0, 1} for AL=2, {0, 1, 2, 3} for AL=4, etc.

In one embodiment, the eNCCE may be re-ordered. For example, for a UE with WB capability, the eNCCE may be numbered in the increasing order of subcarrier indexes, and PRB indexed. For instance, for a channel with a 6 RB bandwidth, eNCCE #0 may occupy subcarriers 0 through 5 of the RB#0, eNCCE #1 may occupy subcarriers 6 through 11 of the RB#0, eNCCE #2 may occupy subcarriers 0 through 5 of the RB#1, eNCCE #3 may occupy subcarriers 6 through 11 of RB#1, and so on. This configuration may be, for example, the configuration of the subframe 100 depicted in FIG. 1.

For a UE with NB capability, the eNCCE may reuse the legacy numbering within the configured 1 RB range. Here, the base station may configure the largest PRB or carrier index to the UE with NB capability to avoid the mutual impact between a configuration for a UE acting in accordance with the WB protocol and a UE acting in accordance with the NB protocol. Alternatively, for UEs with WB capability, the eNCCE may be numbered in the decreasing order of subcarrier indexes and PRB indexed.

Figure 3:
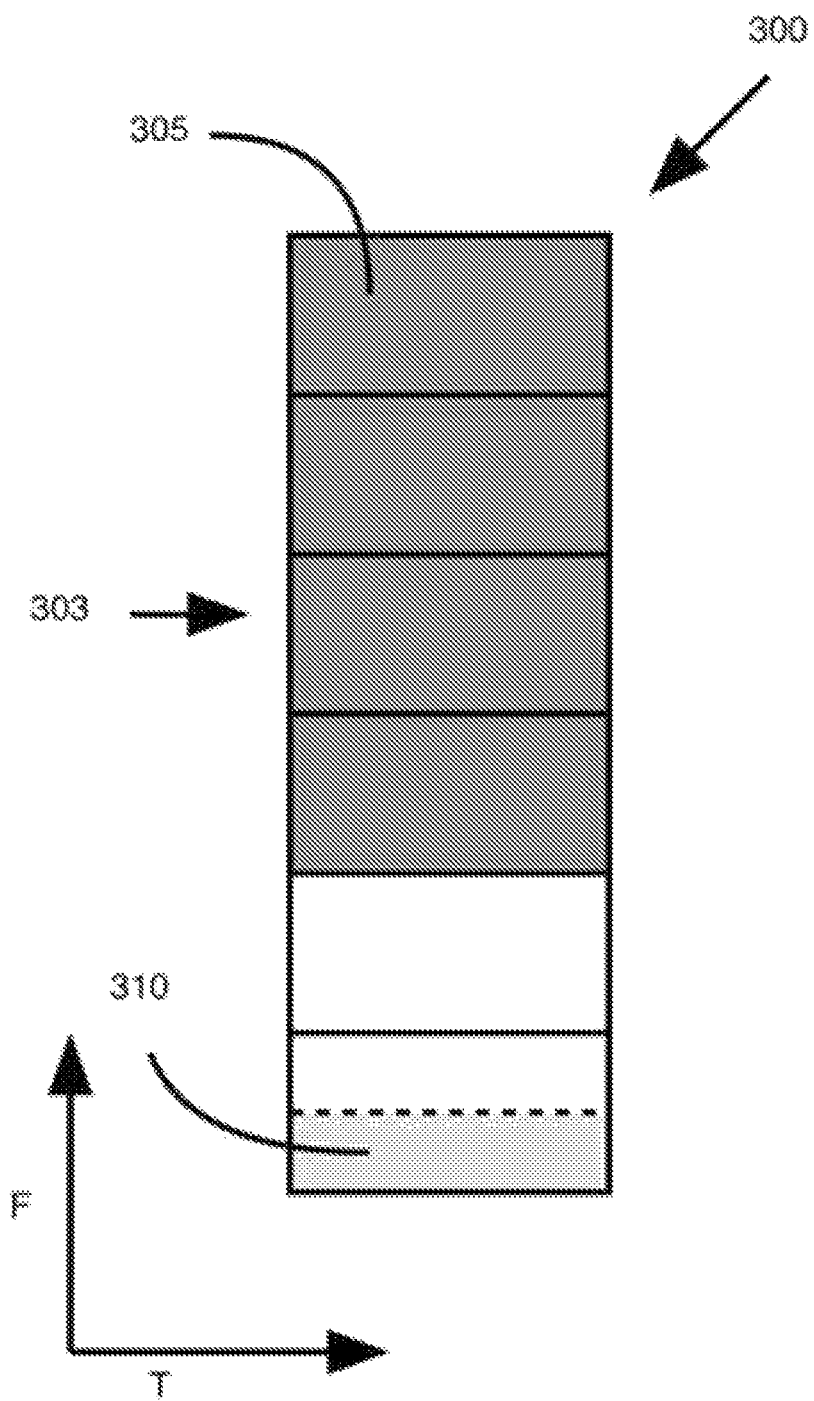
FIG. 3 depicts an example of eNCCE renumbering, in accordance with various embodiments.

FIG. 3 depicts an example of this renumbering. Specifically, FIG. 3 depicts a subframe 300, which may be similar in structure to subframes 100 or 200. Specifically, the subframe 300 may include a number of RBs 303, which may be similar to RBs 103 and 203. The RBs with the lowest index, 305, may include eNCCEs related to a UE that operates in accordance with a WB protocol. By contrast, the RB with the highest index 310 may be include eNCCEs related to a UE that operates in accordance with a NB protocol.

In some embodiments the search space candidates for UEs with WB capability may be increased as compared with legacy NB-IOT search space candidates. Specifically, the UEs with WB capability may use the search space candidates in the eMTC system based on eNCCE.

Figure 4:
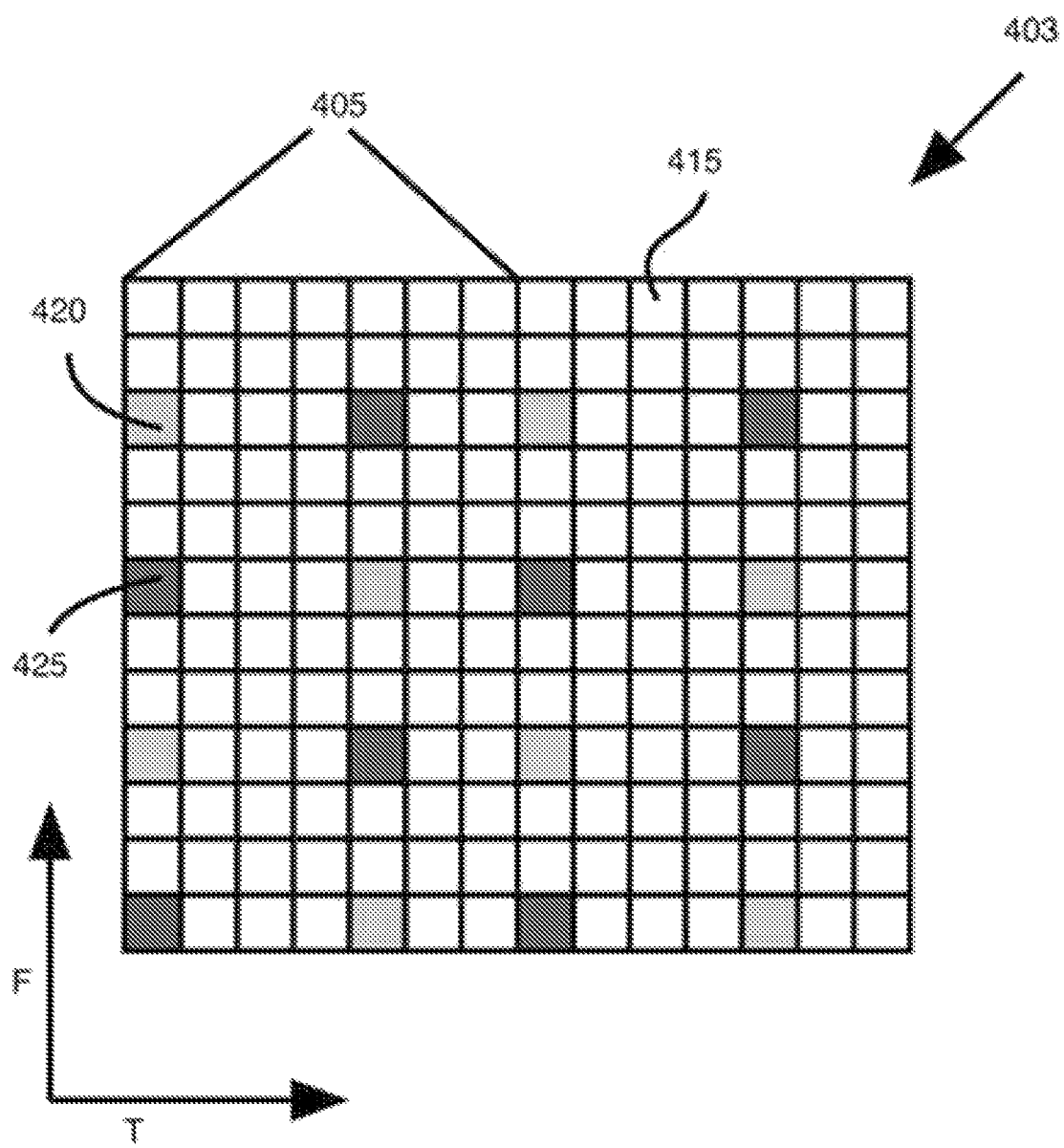
FIG. 4 depicts an example of an RB with eNCCEs related to wideband (WB) UEs and narrowband (NB) UEs, in accordance with various embodiments.

In some embodiments, the base station may transmit a demodulation reference signal (DMRS) Specifically, the DMRS may be related to transmission of the NPDCCH. In some embodiments, the DMRS may use a narrowband reference signal (NRS) RE. FIG. 4 depicts an example of an RB 403. Similarly to RBs 103 or 203, the RB 403 may be composed of 12 subcarriers along the frequency axis F, and 14 symbols along the time axis T. Specifically, the RB 403 may occupy two time slots 405, which may be similar to time slots 115 or 215. Further, the RB 403 may have a number of REs 415, which may be similar to REs 120 or 220.

The RB 403 may include a number of control elements 420 and 425. Specifically, the control elements 420 or 425, or both, may be reference signal (RS) REs. In embodiments one or both of control elements 420 and 425 may be NRS REs, which may be used to transmit the DMRS.

Downlink Control Channel Designed Based on Enhanced Physical Downlink Control Channel (ePDCCH)

The legacy ePDCCH structure may be based on a single RB that includes 16 enhanced resource element groups (eREGs) and four enhanced control channel elements (eCCEs). By contrast, embodiments herein may be based on use of one PRB ePDCCH for UEs that operate in accordance with NB protocols. Generally, for a UE with NB capability, the PRB/carrier index for further ePDCCH (fePDCCH) may be configured by the base station through high layer signaling.

To further simplify the capability for NB UEs, two eCCEs may be aggregated by default, to generate a further eCCE (feCCE) with more REs. For instance, the eCCE0 and eCCE1 may be aggregated, then the DMRS REs of AP107 and AP108 in legacy ePDCCH may be utilized for DMRS REs of the aggregated feCCE0. Similarly, the eCCE 2 and eCCE3 may be aggregated, then the DMRS REs of AP109 and AP 110 in the legacy ePDCCH may be utilized for DMRS REs of the aggregated feCCE 1.

Figure 5:
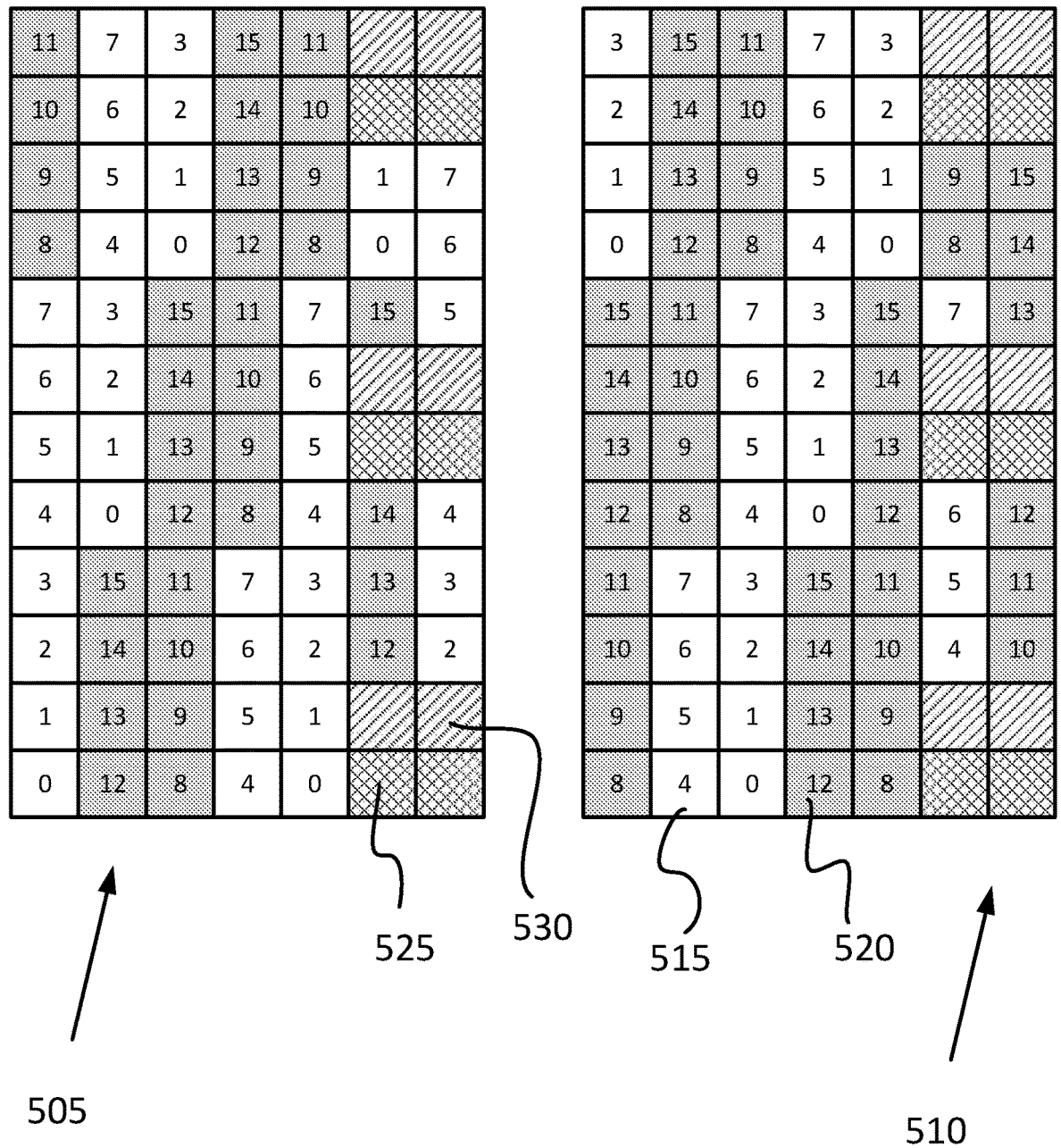
FIG. 5 depicts an example of eNCCE aggregation, in accordance with various embodiments.

An example of this aggregation is depicted in FIG. 5. Specifically, FIG. 5 depicts an RB with two slots, 505 and 510, each comprising 7 symbols in the time direction and 12 subcarriers in the frequency direction. The non-shaded REs 515 of the slots may relate to REs of feCCE0, and the shaded REs 520 may relate to REs of feCCE1. The RB may further include DMRS REs 525 for feCCE1 and DMRS REs 530 for feCCE0.

Figure 6:
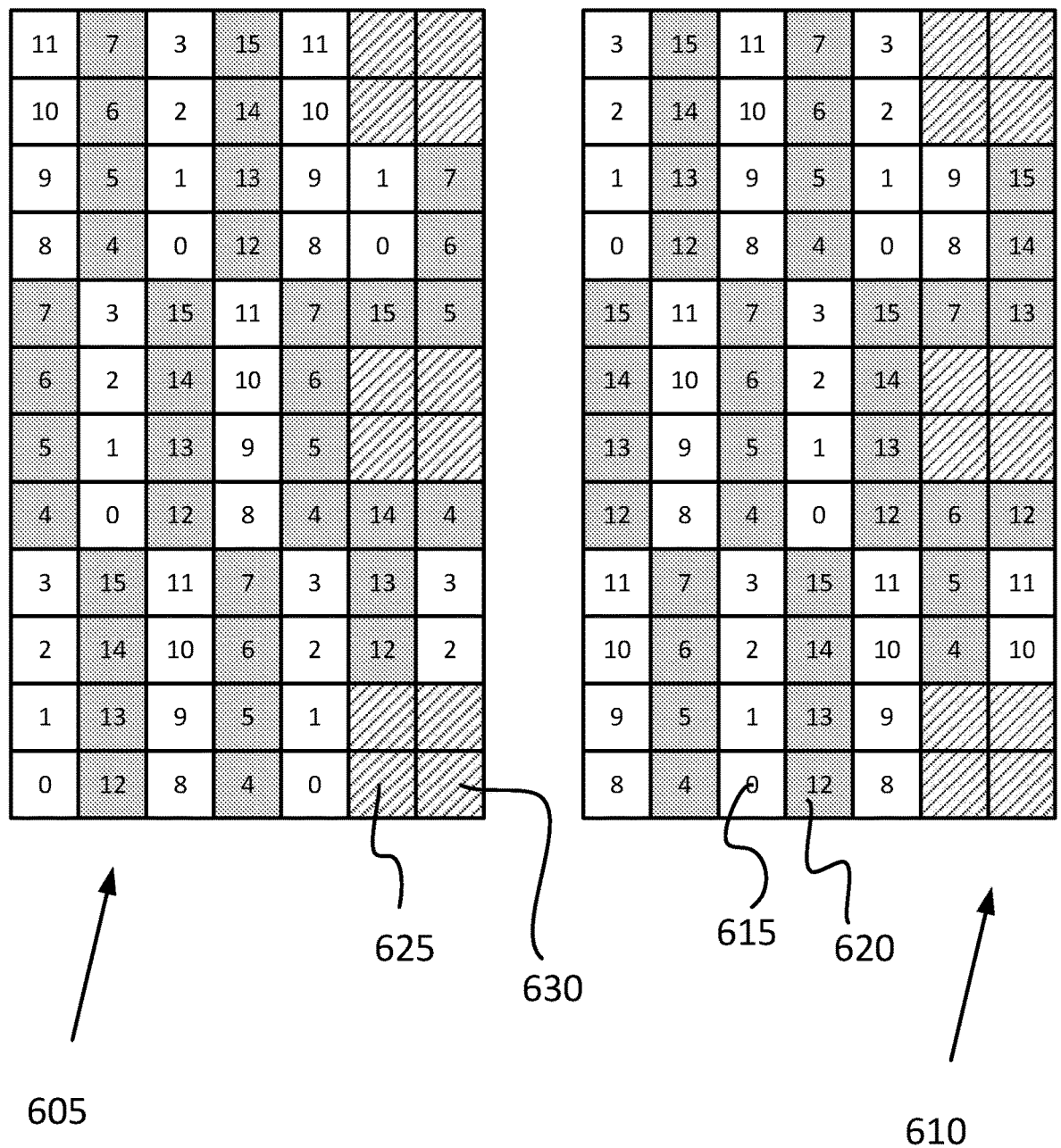
FIG. 6 depicts an alternative example of eNCCE aggregation, in accordance with various embodiments.

Alternatively, eCCE0 and eCCE2 are aggregated, and eCCE0 and eCCE2 are aggregated, then the DMRS of different feCCE can be orthogonal by OCC. It will be understood that this combination may be only one combination, and in another embodiment eCCE0 and eCCe2 may be aggregated, and eCCE1 and eCCE2 may be aggregated, etc. FIG. 6 depicts an example of this embodiment. Similarly to FIG. 5, FIG. 6 depicts an RB that includes two slots 605 and 610, each composed of 7 symbols in the time direction and 12 subcarriers in the frequency direction. The non-shaded REs 615 may relate to REs of feCCE0, and the shaded REs 620 may relate to REs of feCCE1. The slots 605 and 610 may further include DMRS REs 525 and 530, which may be orthogonal to one another. Specifically, the values of the DMRS for feCCE0 may include a value of 1 at DMRS RE 525 and a value of 1 at DMRS RE 530. The values of the DMRS for feCCE1 may include a value of 1 at DMRS RE 525 and a value of −1 at DMRS RE 530. It will be understood that the embodiments of FIG. 5 or 6 are intended as examples and other embodiments may have other configurations or other values for the aggregated eCCEs.

In some embodiments, for a UE with NB capability, the search space candidates, AL, repetition, etc. may reuse values of NB-IOT based on feCCEs. The UEs with NB capability, the search space candidates, AL, repetition, etc. may also reuse values of eMTC based on eCCEs.

Physical Downlink Control Channel for Paging/RA

In some embodiments, one downlink control paging channel may page UEs with NB capability and UEs with WB capability at the same time. Alternatively, the paging for UEs with NB capability may be different from that of the UEs with WB capability, which are separately configured by the base station through high layer signaling. Similarly, the PRB or carrier index for NB or WB downlink control channel can be configured by eNB through high layer signaling; or be pre-defined with the largest/small/central index.

In some embodiments, the downlink control channel resources for random access response (RAR)/Msg3 or re-transmission (ReTx)/Msg4 may be pre-defined. For example, the resources may be pre-defined to be the PRB or carrier with the smallest/largest/central/etc. index.

UEs with NB capability and UEs with WB capability may share the same downlink control channel, if UE's capability is reported after radio resource control (RRC) connection. Alternatively, UEs with NB capability and UEs with WB capability may receive different downlink control channel for RAR/Msg3 ReTx/Msg4, if they can report the capacity at the RACH procedure. After RRC connection, the UE specific downlink control channels configuration can be configured by eNB through high layer signaling.

Physical Downlink Shared Channel (PDSCH) Scheduling

In the legacy NB-IOT system, the DCI format N1 may be utilized to schedule the PDSCH. Examples of use of the DCI N1 format are depicted below in Tables 1 and 2 for unicast PDSCH scheduling and paging scheduling, respectively.

TABLE 1 the DCI N1 for unicast PDSCH scheduling

| Indicator | Number of bits |
|---|---|
| Flag for format N0/format N1 differentiation | 1 |
| NPDCCH order indicator | 1 |
| Scheduling delay | 3 |
| Resource assignment | 3 |
| Modulation and coding scheme | 4 |
| Repetition number | 4 |
| New data indicator (reserved if cyclic redundancy check (CRC) is scrambled with a random access - radio network temporary identifier (RA-RNTI) | 1 |
| Narrowband physical uplink shared channel (NPUSCH) format 2 (hybrid automatic repeat request acknowledgement (HARQ-ACK)) resource (reserved if CRC is scrambled with a RA-RNTI) | 4 |
| DCI subframe repetition number | 2 |

TABLE 2 the DCI N1 for paging scheduling

| Indicator | Number of bits |
|---|---|
| Flag for paging/direct indication differentiation | 1 |
| Resource assignment | 3 |
| Modulation and coding scheme | 4 |
| Repetition number | 4 |
| DCI subframe repetition number | 3 |

UE-Specific Search Space (UESS)

In one embodiment, transmission related to unlicensed NB-IOT may reuse the legacy DCI format N1, and the corresponding UESS. In one embodiment, the maximum DCI repetition times (Rmax) for Unicasted PDSCH scheduling may be reduced to:

r1, r2, r4, r8, r16, r32, r64;

r1, r2, r4, r8, r16, r32, r64, r128;

r1, r2, r4, r8, r16, r32, r64, r128, r256; or r1, r2, r4, r8, r16, r32, r64, r128, r256, r512

In one embodiment, the legacy larger repetition times such as r128, r256, r512, r1024, or r2048 may not be needed. In other words, in some embodiments the maximum possible repetition time may be r64.

Type 1 Cell Search Space (CSS)-Paging

For the Type 1 CSS for paging, the DCI subframe repetition number may be 3 bits. In one embodiment, unlicensed NB-IOT may reuse the legacy DCI format N2 for Type1 CSS, and the corresponding search space.

In one embodiment, the maximum DCI repetition times Rmax for paging scheduling, npdcch-NumRepetitionPaging, may be reduced to:

r1, r2, r4, r8, r16, r32, r64;

r1, r2, r4, r8, r16, r32, r64, r128;

r1, r2, r4, r8, r16, r32, r64, r128, r256; or r1, r2, r4, r8, r16, r32, r64, r128, r256, r512

In one embodiment, the legacy larger repetition times such as r128, r256, r512, r1024, or r2048 may not be needed. In other words, in some embodiments the maximum possible repetition time may be r64.

In one embodiment, the search space of Type 1 CSS may be configured as illustrated in the following table 3:

TABLE 3

| $R_{max}$ | R | | | | | | | | NCCE indices of monitored NPDCCH candidates | |
|---|---|---|---|---|---|---|---|---|---|---|
| | | | | | | | | | L' = 1 | L' = 2 |
| 1 | 1 | — | — | — | — | — | — | — | — | {0, 1} |
| 2 | 1 | 2 | — | — | — | — | — | — | — | {0, 1} |
| 4 | 1 | 2 | 4 | — | — | — | — | — | — | {0, 1} |
| 8 | 1 | 2 | 4 | 8 | — | — | — | — | — | {0, 1} |
| 16 | 1 | 2 | 4 | 8 | 16 | — | — | — | — | {0, 1} |
| 32 | 1 | 2 | 4 | 8 | 16 | 32 | — | — | — | {0, 1} |
| 64 | 1 | 2 | 4 | 8 | 16 | 32 | 64 | — | — | {0, 1} |
| DCI subframe repetition number | 000 | 001 | 010 | 011 | 100 | 101 | 110 | 111 | | |

Note 1:
The terminology{x, y} may denote NPDCCH Format1 candidate corresponding to NCCEs 'x' and 'y' is monitored.

In another embodiment, the search space of Type 1 CSS may be configured as illustrated in the following table 4:

TABLE 4

| $R_{max}$ | R | | | | | | | | NCCE indices of monitored NPDCCH candidates | |
|---|---|---|---|---|---|---|---|---|---|---|
| | | | | | | | | | L' = 1 | L' = 2 |
| 1 | 1 | — | — | — | — | — | — | — | — | {0, 1} |
| 2 | 1 | 2 | — | — | — | — | — | — | — | {0, 1} |
| 4 | 1 | 2 | 4 | — | — | — | — | — | — | {0, 1} |
| 8 | 1 | 2 | 4 | 8 | — | — | — | — | — | {0, 1} |
| 16 | 1 | 2 | 4 | 8 | 16 | — | — | — | — | {0, 1} |
| 32 | 1 | 2 | 4 | 8 | 16 | 32 | — | — | — | {0, 1} |
| 64 | 1 | 2 | 4 | 8 | 16 | 32 | 64 | — | — | {0, 1} |
| 128 | 1 | 2 | 4 | 8 | 16 | 32 | 64 | 128 | — | {0, 1} |
| DCI subframe repetition number | 000 | 001 | 010 | 011 | 100 | 101 | 110 | 111 | | |

Note 1:
The terminology{x, y} may denote NPDCCH Format1 candidate corresponding to NCCEs 'x' and 'y' is monitored.

Type 2 CSS-RA

In one embodiment, unlicensed NB-IOT may reuse the legacy DCI format N2 for Type1 CSS, and the corresponding search space. In one embodiment, the maximum DCI repetition times Rmax for RA, npdcch-NumRepetitions-RA, may be reduced to:

r1, r2, r4, r8, r16, r32, r64;
r1, r2, r4, r8, r16, r32, r64, r128;
r1, r2, r4, r8, r16, r32, r64, r128, r256; or
r1, r2, r4, r8, r16, r32, r64, r128, r256, r512.

In some embodiments, the legacy larger repetition times such as r128, r256, r512, r1024, or r2048 may not be needed. In other words, in some embodiments the maximum possible repetition time may be r64.

Physical Uplink Shared Channel (PUSCH) Scheduling

In some embodiments, the DCI for PUSCH scheduling may be as shown in the following Table 5:

| Indicator | Number of bits |
|---|---|
| Flag for format N0/format N1 differentiation | 1 |
| Subcarrier indication | 6 |
| Resource assignment | 3 |
| Scheduling delay | 2 |
| Modulation and coding scheme | 4 |
| Redundancy version | 1 |
| Repetition number | 3 |
| New data indicator | 1 |
| DCI subframe repetition number | 2 |

In one embodiment, unlicensed NB-IOT transmissions may reuse the legacy DCI format N0 for PUSCH scheduling, and the corresponding search space. In one embodiment, the reserved subcarrier indication may be interpreted as the explicit ACK of PUSCH. After receiving this explicit HARQ, a UE may flush its PUSCH buffer. In some embodiments, an additional reserved subcarrier indication can be interpreted as explicit ACK for early termination of PUSCH transmission. After UE receives the explicit ACK, it may similarly flush its PUSCH buffer.

In one embodiment, the larger repetition times of PUSCH may be reserved, e.g. 64, 128. The reserved states of repetition number may be utilized as the explicit ACK indication for early termination of machine type communication downlink control channel (MDCCH) or early termination of PUSCH transmission. In another embodiment, the reserved states of modulation and coding schemes may be utilized as the explicit ACK indication for early termination of MDCCH or early termination of PUSCH transmission.

In one embodiment, if only one HARQ is supported by UE, then one state of explicit ACK may be desired. In another embodiment, if two HARQ-ProcessesConfig is configured, then three states may be desired. Specifically, it may be desirable to have one state for ACK of HARQ 1; one state for ACK of HARQ 2; and one state for ACK of both HARQ 1 and HARQ 2.

Figure 7:
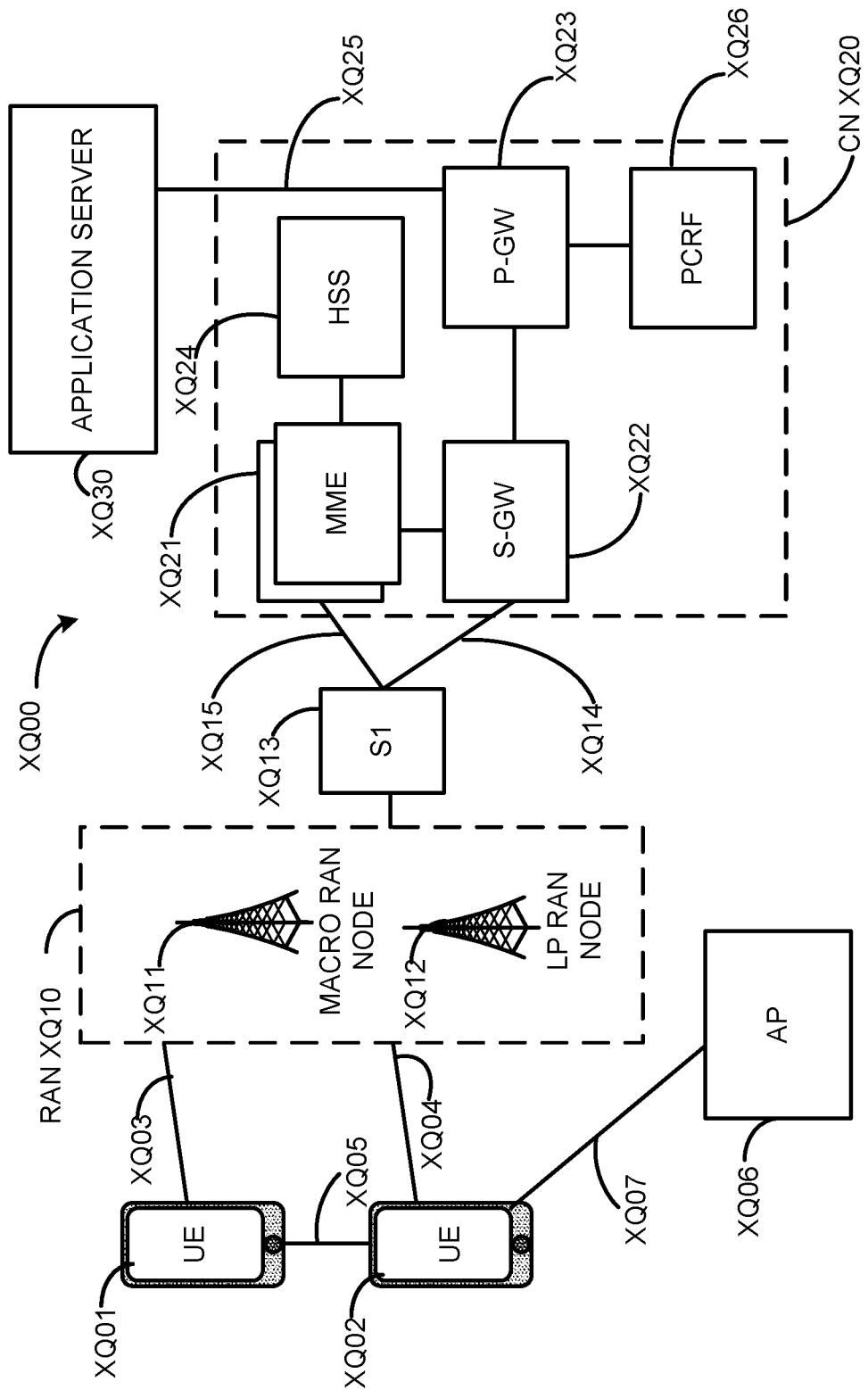
FIG. 7 illustrates an architecture of a system of a network in accordance with some embodiments.

FIG. 7 illustrates an architecture of a system XQ00 of a network in accordance with some embodiments. The system XQ00 is shown to include a user equipment (UE) XQ01 and a UE XQ02. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs XQ01 and XQ02 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart"

appliances, machine-type communications (MTC) devices, machine-to-machine (M2M), Internet of Things (IoT) devices, and/or the like.

In some embodiments, any of the UEs XQ01 and XQ02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XQ01 and XQ02 may be configured to connect, e.g., communicatively couple, with a radio access network (RAN) XQ10. The RAN XQ10 may be, for example, an Evolved Universal Mobile Telecommunications System (UMTS) Terrestrial Radio Access Network (E-UTRAN), a NextGen RAN (NG RAN), or some other type of RAN. The UEs XQ01 and XQ02 utilize connections (or channels) XQ03 and XQ04, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections XQ03 and XQ04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XQ01 and XQ02 may further directly exchange communication data via a ProSe interface XQ05. The ProSe interface XQ05 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface XQ05 may be used in vehicular applications and communications technologies, which are often referred to as V2X systems. V2X is a mode of communication where UEs (for example, UEs XQ01, XQ02) communicate with each other directly over the PC5/SL interface XQ05 and can take place when the UEs XQ01, XQ02 are served by RAN nodes XQ11, XQ12 or when one or more UEs are outside a coverage area of the RAN XQ10. V2X may be classified into four different types: vehicle-to-vehicle (V2V), vehicle-to-infrastructure (V2I), vehicle-to-network (V2N), and vehicle-to-pedestrian (V2P). These V2X applications can use "cooperative awareness" to provide more intelligent services for end-users. For example, vehicle UEs (vUEs) XQ01, XQ02, RAN nodes XQ11, XQ12, application servers XQ30, and pedestrian UEs XQ01, XQ02 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs XQ01, XQ02 may be implemented/employed as Vehicle Embedded Communications Systems (VECS) or vUEs.

The UE XQ02 is shown to be configured to access an access point (AP) XQ06 (also referred to as "WLAN node XQ06", "WLAN XQ06", "WLAN Termination XQ06" or "WT XQ06" or the like) via connection XQ07. The connection XQ07 can comprise a local wireless connection, such as a connection consistent with any IEEE 802.11 protocol, wherein the AP XQ06 would comprise a wireless fidelity (WiFi®) router. In this example, the AP XQ06 is shown to be connected to the Internet without connecting to the core network of the wireless system (described in further detail below). In various embodiments, the UE XQ02, RAN XQ10, and AP XQ06 may be configured to utilize LTE-WLAN aggregation (LWA) operation and/or WLAN LTE/WLAN Radio Level Integration with IPsec Tunnel (LWIP) operation. The LWA operation may involve the UE XQ02 in RRC_CONNECTED being configured by a RAN node XQ11, XQ12 to utilize radio resources of LTE and WLAN. LWIP operation may involve the UE XQ02 using WLAN radio resources (e.g., connection XQ07) via Internet Protocol Security (IPsec) protocol tunneling to authenticate and encrypt packets (e.g., internet protocol (IP) packets) sent over the connection XQ07. IPsec tunneling may include encapsulating entirety of original IP packets and adding a new packet header, thereby protecting the original header of the IP packets.

The RAN XQ10 can include one or more access nodes that enable the connections XQ03 and XQ04. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN XQ10 may include one or more RAN nodes for providing macrocells, e.g., macro RAN node XQ11, and one or more RAN nodes for providing femtocells or picocells (e.g., cells having smaller coverage areas, smaller user capacity, or higher bandwidth compared to macrocells), e.g., low power (LP) RAN node XQ12.

Any of the RAN nodes XQ11 and XQ12 can terminate the air interface protocol and can be the first point of contact for the UEs XQ01 and XQ02. In some embodiments, any of the RAN nodes XQ11 and XQ12 can fulfill various logical functions for the RAN XQ10 including, but not limited to, radio network controller (RNC) functions such as radio bearer management, uplink and downlink dynamic radio resource management and data packet scheduling, and mobility management.

In accordance with some embodiments, the UEs XQ01 and XQ02 can be configured to communicate using Orthogonal Frequency-Division Multiplexing (OFDM) communication signals with each other or with any of the RAN nodes XQ11 and XQ12 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XQ11 and XQ12 to the UEs XQ01 and XQ02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs XQ01, XQ02 and the RAN nodes XQ11, XQ12 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs XQ01, XQ02 and the RAN nodes XQ11, XQ12 may operate using Licensed Assisted Access (LAA), enhanced LAA (eLAA), and/or further eLAA (feLAA) mechanisms. In these implementations, the UEs XQ01, XQ02 and the RAN nodes XQ11, XQ12 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs XQ01, XQ02, RAN nodes XQ11, XQ12, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UE XQ01 or XQ02, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (μs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE XQ01, XQ02 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs XQ01 and XQ02. The physical downlink control channel (PDCCH) may carry information about the transport format and resource allocations related to the PDSCH channel, among other things. It may also inform the UEs XQ01 and XQ02 about the transport format, resource allocation, and H-ARQ (Hybrid Automatic Repeat Request) information related to the uplink shared channel. Typically, downlink scheduling (assigning control and shared channel resource blocks to the UE XQ02 within a cell) may be performed at any of the RAN nodes XQ11 and XQ12 based on channel quality information fed back from any of the UEs XQ01 and XQ02. The downlink resource assignment information may be sent on the PDCCH used for (e.g., assigned to) each of the UEs XQ01 and XQ02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN XQ10 is shown to be communicatively coupled to a core network (CN) XQ20 via an S1 interface XQ13. In embodiments, the CN XQ20 may be an evolved packet core (EPC) network, a NextGen Packet Core (NPC) network, or some other type of CN. In this embodiment the S1 interface XQ13 is split into two parts: the S1-U interface XQ14, which carries traffic data between the RAN nodes XQ11 and XQ12 and the serving gateway (S-GW) XQ22, and the S1-mobility management entity (MME) interface XQ15, which is a signaling interface between the RAN nodes XQ11 and XQ12 and MMEs XQ21.

In this embodiment, the CN XQ20 comprises the MMEs XQ21, the S-GW XQ22, the Packet Data Network (PDN) Gateway (P-GW) XQ23, and a home subscriber server (HSS) XQ24. The MMEs XQ21 may be similar in function to the control plane of legacy Serving General Packet Radio Service (GPRS) Support Nodes (SGSN). The MMEs XQ21 may manage mobility aspects in access such as gateway selection and tracking area list management. The HSS XQ24 may comprise a database for network users, including subscription-related information to support the network entities' handling of communication sessions. The CN XQ20 may comprise one or several HSSs XQ24, depending on the number of mobile subscribers, on the capacity of the equipment, on the organization of the network, etc. For example, the HSS XQ24 can provide support for routing/roaming, authentication, authorization, naming/addressing resolution, location dependencies, etc.

The S-GW XQ22 may terminate the S1 interface XQ13 towards the RAN XQ10, and routes data packets between the RAN XQ10 and the CN XQ20. In addition, the S-GW XQ22 may be a local mobility anchor point for inter-RAN node handovers and also may provide an anchor for inter-3GPP mobility. Other responsibilities may include lawful intercept, charging, and some policy enforcement.

The P-GW XQ23 may terminate an SGi interface toward a PDN. The P-GW XQ23 may route data packets between the EPC network XQ20 and external networks such as a network including the application server XQ30 (alternatively referred to as application function (AF)) via an Internet Protocol (IP) interface XQ25. Generally, the application server XQ30 may be an element offering applications that use IP bearer resources with the core network (e.g., UMTS Packet Services (PS) domain, LTE PS data services, etc.). In this embodiment, the P-GW XQ23 is shown to be communicatively coupled to an application server XQ30 via an IP communications interface XQ25. The application server XQ30 can also be configured to support one or more communication services (e.g., Voice-over-Internet Protocol (VoIP) sessions, PTT sessions, group communication sessions, social networking services, etc.) for the UEs XQ01 and XQ02 via the CN XQ20.

The P-GW XQ23 may further be a node for policy enforcement and charging data collection. Policy and Charging Rules Function (PCRF) XQ26 is the policy and charging control element of the CN XQ20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF XQ26 may be communicatively coupled to the application server XQ30 via the P-GW XQ23. The application server XQ30 may signal the PCRF XQ26 to indicate a new service flow and select the appropriate Quality of Service (QoS) and charging parameters. The PCRF XQ26 may provision this rule into a Policy and Charging Enforcement Function (PCEF) (not shown) with the appropriate traffic flow template (TFT) and QoS class of identifier (QCI), which commences the QoS and charging as specified by the application server XQ30.

Figure 8:
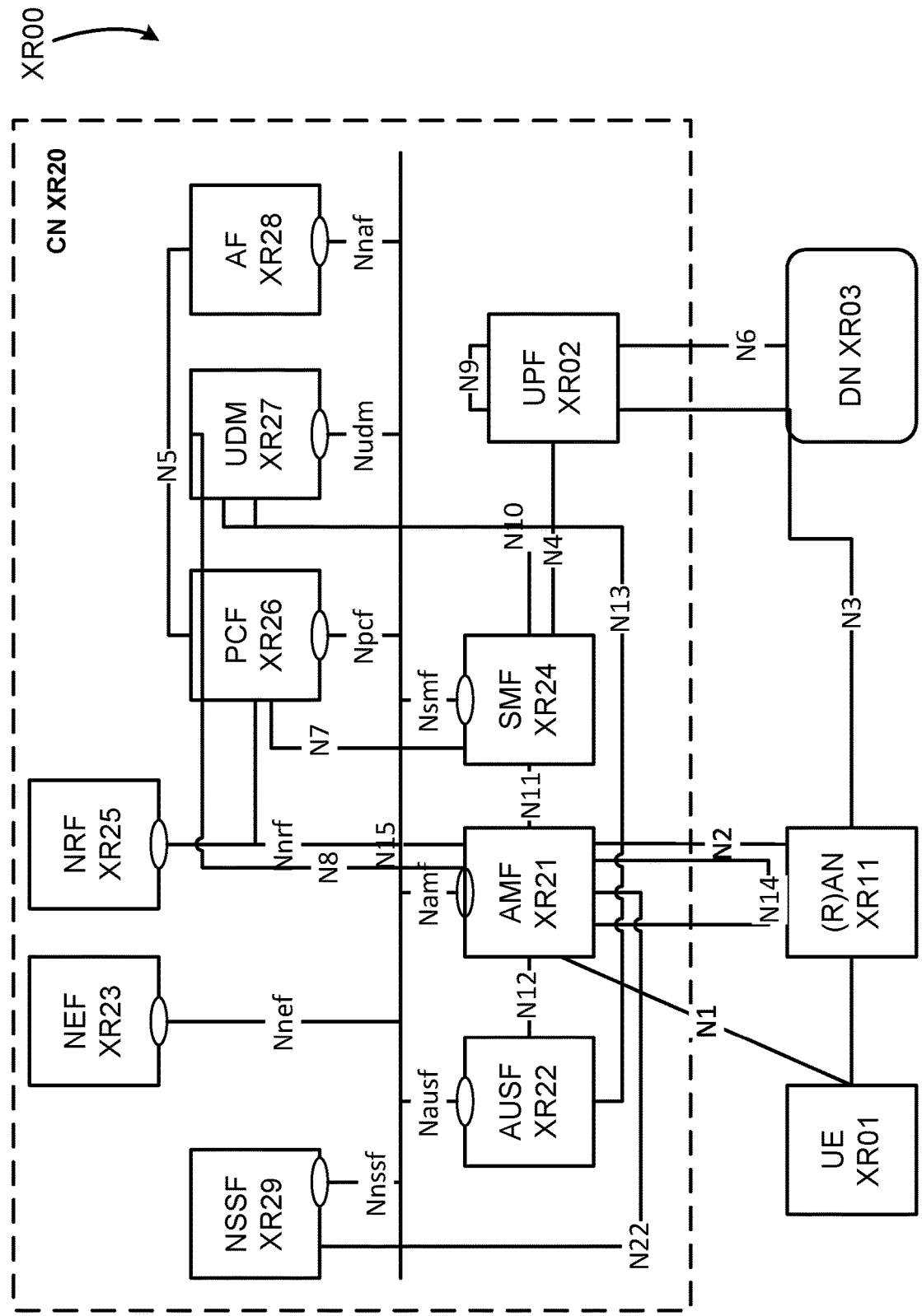
FIG. 8 illustrates an architecture of a system of a network in accordance with some embodiments.

FIG. 8 illustrates an architecture of a system XR00 of a network in accordance with some embodiments. The system XR00 is shown to include a UE XR01, which may be the same or similar to UEs XQ01 and XQ02 discussed previously; a RAN node XR11, which may be the same or similar to RAN nodes XQ11 and XQ12 discussed previously; a Data Network (DN) XR03, which may be, for example, operator services, Internet access or 3rd party services; and a 5G Core Network (5GC or CN) XR20.

The CN XR20 may include an Authentication Server Function (AUSF) XR22; an Access and Mobility Management Function (AMF) XR21; a Session Management Function (SMF) XR24; a Network Exposure Function (NEF)

XR23; a Policy Control Function (PCF) XR26; a Network Function (NF) Repository Function (NRF) XR25; a Unified Data Management (UDM) XR27; an Application Function (AF) XR28; a User Plane Function (UPF) XR02; and a Network Slice Selection Function (NSSF) XR29.

The UPF XR02 may act as an anchor point for intra-RAT and inter-RAT mobility, an external PDU session point of interconnect to DN XR03, and a branching point to support multi-homed PDU session. The UPF XR02 may also perform packet routing and forwarding, perform packet inspection, enforce user plane part of policy rules, lawfully intercept packets (UP collection), traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF XR02 may include an uplink classifier to support routing traffic flows to a data network. The DN XR03 may represent various network operator services, Internet access, or third party services. DN XR03 may include, or be similar to, application server XQ30 discussed previously. The UPF XR02 may interact with the SMF XR24 via an N4 reference point between the SMF XR24 and the UPF XR02.

The AUSF XR22 may store data for authentication of UE XR01 and handle authentication related functionality. The AUSF XR22 may facilitate a common authentication framework for various access types. The AUSF XR22 may communicate with the AMF XR21 via an N12 reference point between the AMF XR21 and the AUSF XR22; and may communicate with the UDM XR27 via an N13 reference point between the UDM XR27 and the AUSF XR22. Additionally, the AUSF XR22 may exhibit an Nausf service-based interface.

The AMF XR21 may be responsible for registration management (e.g., for registering UE XR01, etc.), connection management, reachability management, mobility management, and lawful interception of AMF-related events, and access authentication and authorization. The AMF XR21 may be a termination point for an N11 reference point between the AMF XR21 and the SMF XR24. The AMF XR21 may provide transport for Session Management (SM) messages between the UE XR01 and the SMF XR24, and act as a transparent proxy for routing SM messages. AMF XR21 may also provide transport for short message service (SMS) messages between UE XR01 and an SMS function (SMSF) (not shown by FIG. 8). AMF XR21 may act as Security Anchor Function (SEAF), which may include interaction with the AUSF XR22 and the UE XR01, as well as receipt of an intermediate key that was established as a result of the UE XR01 authentication process. Where UMTS Subscriber Identity Module (USIM) based authentication is used, the AMF XR21 may retrieve the security material from the AUSF XR22. AMF XR21 may also include a Security Context Management (SCM) function, which receives a key from the SEAF that it uses to derive access-network specific keys. Furthermore, AMF XR21 may be a termination point of RAN CP interface, which may include or be an N2 reference point between the (R)AN XR11 and the AMF XR21; and the AMF XR21 may be a termination point of NAS (N1) signalling, and perform NAS ciphering and integrity protection.

AMF XR21 may also support NAS signalling with a UE XR01 over an N3 interworking-function (IWF) interface. The N3IWF may be used to provide access to untrusted entities. N3IWF may be a termination point for the N2 interface between the (R)AN XR11 and the AMF XR21 for the control plane, and may be a termination point for the N3 reference point between the (R)AN XR11 and the UPF XR02 for the user plane. As such, the AMF XR21 may handle N2 signalling from the SMF XR24 and the AMF XR21 for PDU sessions and QoS, encapsulate/de-encapsulate packets for IPSec and N3 tunnelling, mark N3 user-plane packets in the uplink, and enforce QoS corresponding to N3 packet marking, which may take into account QoS requirements associated to such marking received over N2. N3IWF may also relay uplink and downlink control-plane NAS signalling between the UE XR01 and AMF XR21 via an N1 reference point between the UE XR01 and the AMF XR21, and relay uplink and downlink user-plane packets between the UE XR01 and UPF XR02. The N3IWF also provides mechanisms for IPsec tunnel establishment with the UE XR01. The AMF XR21 may exhibit an Namf service-based interface, and may be a termination point for an N14 reference point between two AMFs XR21 and an N17 reference point between the AMF XR21 and a 5G-Equipment Identity Register (5G-EIR) (not shown by FIG. 8).

The SMF XR24 may be responsible for session management (e.g., session establishment, modify and release, including tunnel maintain between UPF and AN node). The SMF XR24 may also allocate and manage UE IP addresses (including optional authorization), select and control UP functions, and configures traffic steering at the UPF XR02 to route traffic to a proper destination. The SMF XR24 may also terminate interfaces towards Policy Control Functions, control part of policy enforcement and QoS, and perform lawful interception (e.g., for SM events and interface to LI system). The SMF XR24 may also terminate SM parts of NAS messages, provide downlink data notification, and initiate AN specific SM information, sent via AMF over N2 to AN, and determine Session and Service Continuity (SSC) mode of a session.

The SMF XR24 may include the following roaming functionality: handle local enforcement to apply QoS SLAB (VPLMN); charging data collection and charging interface (VPLMN); lawful intercept (in VPLMN for SM events and interface to LI System); and support for interaction with external DN for transport of signalling for PDU session authorization/authentication by external DN. An N16 reference point between two SMFs XR24 may be included in the system XR00, which may be between another SMF XR24 in a visited network and the SMF XR24 in the home network in roaming scenarios. Additionally, the SMF XR24 may exhibit the Nsmf service-based interface.

The NEF XR23 may provide means for securely exposing the services and capabilities provided by 3GPP network functions for third party, internal exposure/re-exposure, Application Functions (e.g., AF XR28), edge computing or fog computing systems, etc. In such embodiments, the NEF XR23 may authenticate, authorize, and/or throttle the AFs. NEF XR23 may also translate information exchanged with the AF XR28 and information exchanged with internal network functions. For example, the NEF XR23 may translate between an AF-Service-Identifier and an internal 5GC information. NEF XR23 may also receive information from other network functions (NFs) based on exposed capabilities of other network functions. This information may be stored at the NEF XR23 as structured data, or at a data storage NF using standardized interfaces. The stored information can then be re-exposed by the NEF XR23 to other NFs and AFs, and/or used for other purposes such as analytics. Additionally, the NEF XR23 may exhibit an Nnef service-based interface.

The NRF XR25 may support service discovery functions, receive NF Discovery Requests from NF instances, and provide the information of the discovered NF instances to the NF instances. NRF XR25 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF XR25 may exhibit the Nnrf service-based interface.

The PCF XR26 may provide policy rules to control plane function(s) to enforce them, and may also support unified policy framework to govern network behavior. The PCF XR26 may also implement a front end (FE) to access subscription information relevant for policy decisions in a Unified Data Repository (UDR) of the UDM XR27. The PCF XR26 may communicate with the AMF XR21 via an N15 reference point between the PCF XR26 and the AMF XR21, which may include a PCF XR26 in a visited network and the AMF XR21 in case of roaming scenarios. The PCF XR26 may communicate with the AF XR28 via an N5 reference point between the PCF XR26 and the AF XR28; and with the SMF XR24 via an N7 reference point between the PCF XR26 and the SMF XR24. The system XR00 and/or CN XR20 may also include an N24 reference point between the PCF XR26 (in the home network) and a PCF XR26 in a visited network. Additionally, the PCF XR26 may exhibit an Npcf service-based interface.

The UDM XR27 may handle subscription-related information to support the network entities' handling of communication sessions, and may store subscription data of UE XR01. For example, subscription data may be communicated between the UDM XR27 and the AMF XR21 via an N8 reference point between the UDM XR27 and the AMF XR21 (not shown by FIG. 8). The UDM XR27 may include two parts, an application FE and a User Data Repository (UDR) (the FE and UDR are not shown by FIG. 8). The UDR may store subscription data and policy data for the UDM XR27 and the PCF XR26, and/or structured data for exposure and application data (including Packet Flow Descriptions (PFDs) for application detection, application request information for multiple UEs XR01) for the NEF XR23. The Nudr service-based interface may be exhibited by the UDR to allow the UDM XR27, PCF XR26, and NEF XR23 to access a particular set of the stored data, as well as to read, update (e.g., add, modify), delete, and subscribe to notification of relevant data changes in the UDR. The UDM XR27 may include a UDM FE, which is in charge of processing credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF XR24 via an N10 reference point between the UDM XR27 and the SMF XR24. UDM XR27 may also support SMS management, wherein an SMS-FE implements the similar application logic as discussed previously. Additionally, the UDM XR27 may exhibit the Nudm service-based interface.

The AF XR28 may provide application influence on traffic routing, provide access to the Network Capability Exposure (NCE), and interact with the policy framework for policy control. The NCE may be a mechanism that allows the 5GC and AF XR28 to provide information to each other via NEF XR23, which may be used for edge computing implementations. In such implementations, the network operator and third party services may be hosted close to the UE XR01 access point of attachment to achieve an efficient service delivery through the reduced end-to-end latency and load on the transport network. For edge computing implementations, the 5GC may select a UPF XR02 close to the UE XR01 and execute traffic steering from the UPF XR02 to DN XR03 via the N6 interface. This may be based on the UE subscription data, UE location, and information provided by the AF XR28. In this way, the AF XR28 may influence UPF (re)selection and traffic routing. Based on operator deployment, when AF XR28 is considered to be a trusted entity, the network operator may permit AF XR28 to interact directly with relevant NFs. Additionally, the AF XR28 may exhibit an Naf service-based interface.

The NSSF XR29 may select a set of network slice instances serving the UE XR01. The NSSF XR29 may also determine allowed Network Slice Selection Assistance Information (NSSAI) and the mapping to the Subscribed Single-NSSAIs (S-NSSAIs), if needed. The NSSF XR29 may also determine the AMF set to be used to serve the UE XR01, or a list of candidate AMF(s) XR21 based on a suitable configuration and possibly by querying the NRF XR25. The selection of a set of network slice instances for the UE XR01 may be triggered by the AMF XR21 with which the UE XR01 is registered by interacting with the NSSF XR29, which may lead to a change of AMF XR21. The NSSF XR29 may interact with the AMF XR21 via an N22 reference point between AMF XR21 and NSSF XR29; and may communicate with another NSSF XR29 in a visited network via an N31 reference point (not shown by FIG. 8). Additionally, the NSSF XR29 may exhibit an Nnssf service-based interface.

As discussed previously, the CN XR20 may include an SMSF, which may be responsible for SMS subscription checking and verification, and relaying SM messages to/from the UE XR01 to/from other entities, such as an Short Message Service (SMS)-Global Systems for Mobile Communication (GMSC)/Inter-Working Mobile Switching Center (IWMSC)/SMS-router. The SMS may also interact with AMF XR21 and UDM XR27 for notification procedure that the UE XR01 is available for SMS transfer (e.g., set a UE not reachable flag, and notifying UDM XR27 when UE XR01 is available for SMS).

The CN XR20 may also include other elements that are not shown by FIG. 8, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 8). Individual NFs may share a UDSF for storing their respective unstructured data or individual NFs may each have their own UDSF located at or near the individual NFs. Additionally, the UDSF may exhibit an Nudsf service-based interface (not shown by FIG. 8). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 8 for clarity. In one example, the CN XR20 may include an Nx interface, which is an inter-CN interface between the MME (e.g., MME XQ21) and the AMF XR21 in order to enable interworking between CN XR20 and CN XQ20. Other example interfaces/reference points may include an N5 g-EIR service-based interface exhibited by a 5G-EIR, an N27 reference point between an NRF in the visited network and the NRF in the home network; and an N31 reference point between the NSSF in the visited network and the NSSF in the home network.

In yet another example, system XR00 may include multiple RAN nodes XR11 wherein an Xn interface is defined between two or more RAN nodes XR11 (e.g., gNBs and the like) connecting to 5GC XR20, between a RAN node XR11 (e.g., gNB) connecting to 5GC XR20 and an eNB (e.g., a RAN node XQ11 of FIG. 7), and/or between two eNBs connecting to 5GC XR20. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; and mobility support for UE XR01 in a connected mode (e.g., CM-CONNECTED) including functionality to manage the UE mobility for connected mode between one or more RAN nodes XR11. The mobility support may include context transfer from an old (source) serving RAN node XR11 to new (target) serving RAN node XR11; and control of user plane tunnels between old (source) serving RAN node XR11 to new (target) serving RAN node XR11. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same or similar to the user plane and/or control plane protocol stack(s) shown and described herein.

Figure 9:
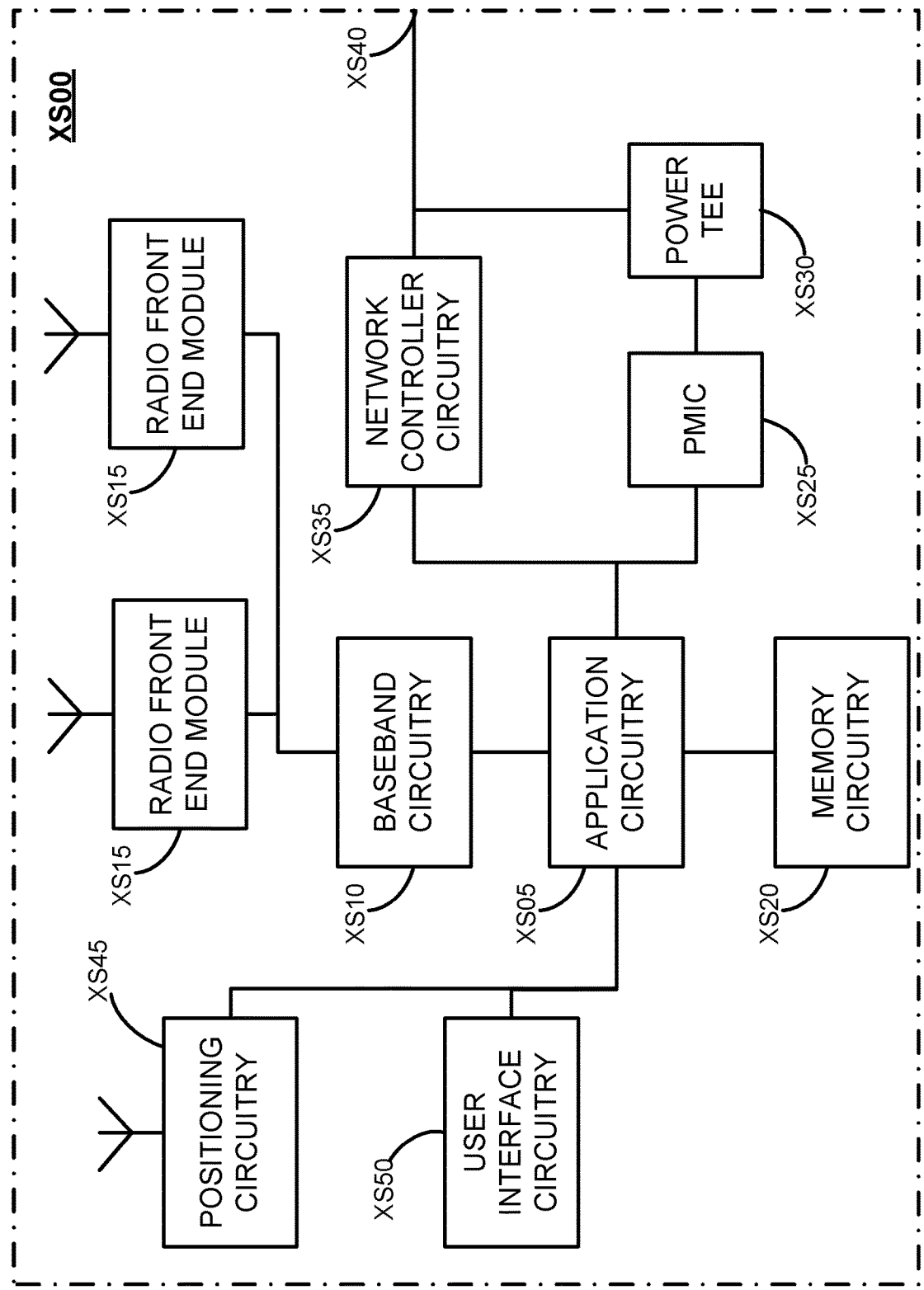
FIG. 9 illustrates an example of infrastructure equipment in accordance with various embodiments.

FIG. 9 illustrates an example of infrastructure equipment XS00 in accordance with various embodiments. The infrastructure equipment XS00 (or "system XS00") may be implemented as a base station, radio head, RAN node, etc., such as the RAN nodes XQ11 and XQ12, and/or AP XQ06 shown and described previously. In other examples, the system XS00 could be implemented in or by a UE, application server(s) XQ30, and/or any other element/device discussed herein. The system XS00 may include one or more of application circuitry XS05, baseband circuitry XS10, one or more radio front end modules XS15, memory XS20, power management integrated circuitry (PMIC) XS25, power tee circuitry XS30, network controller XS35, network interface connector XS40, satellite positioning circuitry XS45, and user interface XS50. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network XQ20 (or CN XR20 discussed previously) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry XS05 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry XS05 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system XS00 may not utilize application circuitry XS05, and instead may include a special-purpose processor/controller to process IP data received from an EPC or 5GC, for example.

Additionally or alternatively, application circuitry XS05 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XS05 may comprise logic blocks or logic fabric including other interconnected resources that may be programmed to perform various functions, such as the procedures, methods, functions, etc. of the various embodiments discussed herein. In such embodiments, the circuitry of application circuitry XS05 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry XS10 may be implemented, for example, as a solder-down substrate including one or more integrated circuits, a single packaged integrated circuit soldered to a main circuit board or a multi-chip module containing two or more integrated circuits. Although not shown, baseband circuitry XS10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XS10 may include protocol processing circuitry with one or more instances of control circuitry (not shown) to provide control functions for the digital baseband circuitry and/or radio frequency circuitry (for example, the radio front end modules XS15).

User interface circuitry XS50 may include one or more user interfaces designed to enable user interaction with the system XS00 or peripheral component interfaces designed to enable peripheral component interaction with the system XS00. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) XS15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XS15. The RFEMs XS15 may incorporate both millimeter wave antennas and sub-millimeter wave antennas.

The memory circuitry XS20 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry XS20 may be implemented as one or more of solder down packaged integrated circuits, socketed memory modules and plug-in memory cards.

The PMIC XS25 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry XS30 may provide for electrical power drawn from a network cable to provide both power supply and data connectivity to the infrastructure equipment XS00 using a single cable.

The network controller circuitry XS35 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment XS00 via network interface connector XS40 using a physical connection, which may be electrical (commonly referred to as a "copper interconnect"), optical, or wireless. The network controller circuitry XS35 may include one or more dedicated processors and/or FPGAs to communicate using one or more of the aforementioned protocol. In some implementations, the network controller circuitry XS35 may include multiple controllers to provide connectivity to other networks using the same or different protocols.

The positioning circuitry XS45 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry XS45 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry XS45 and/or positioning circuitry implemented by UEs XQ01, XQ02, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry XS45 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry XS45 may provide data to application circuitry XS05, which may include one or more of position data or time data. Application circuitry XS05 may use the time data to synchronize operations with other radio base stations (e.g., RAN nodes XQ11, XQ12, XR11 or the like).

The components shown by FIG. 9 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 10:
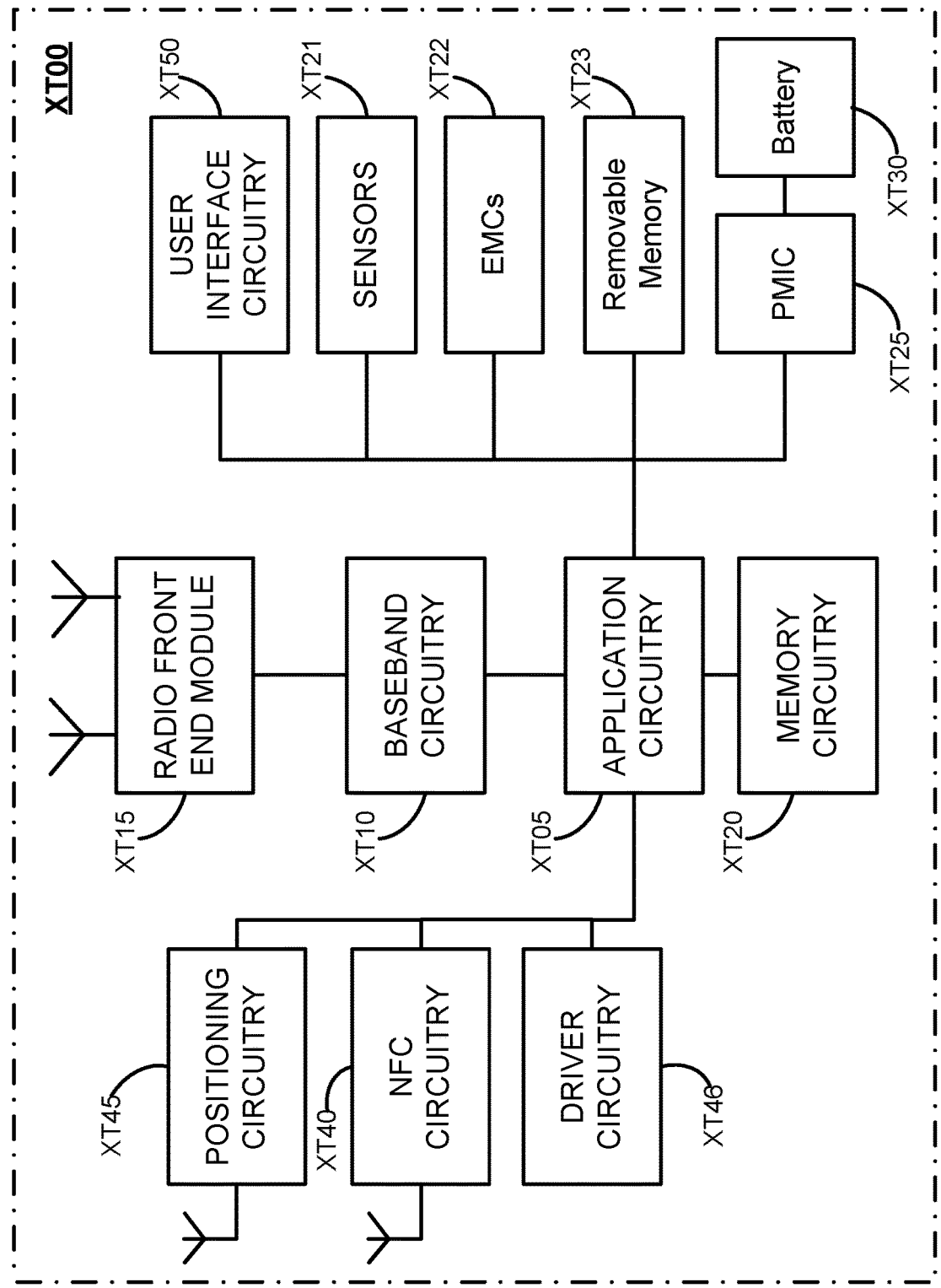
FIG. 10 illustrates an example of a platform in accordance with various embodiments.

FIG. 10 illustrates an example of a platform XT00 (or "device XT00") in accordance with various embodiments. In embodiments, the computer platform XT00 may be suitable for use as UEs XQ01, XQ02, XR01, application servers XQ30, and/or any other element/device discussed herein. The platform XT00 may include any combinations of the components shown in the example. The components of platform XT00 may be implemented as integrated circuits (ICs), portions thereof, discrete electronic devices, or other modules, logic, hardware, software, firmware, or a combination thereof adapted in the computer platform XT00, or as components otherwise incorporated within a chassis of a larger system. The block diagram of FIG. 10 is intended to show a high level view of components of the computer platform XT00. However, some of the components shown may be omitted, additional components may be present, and different arrangement of the components shown may occur in other implementations.

The application circuitry XT05 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform XT00. In some embodiments, processors of application circuitry XS05/XT05 may process IP data packets received from an EPC or 5GC.

Application circuitry XT05 may be or may include a microprocessor, a multi-core processor, a multithreaded processor, an ultra-low voltage processor, an embedded processor, or other known processing element. In one example, the application circuitry XT05 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry XT05 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry XT05 may be a part of a system on a chip (SoC) in which the application circuitry XT05 and other components are formed into a single integrated circuit, or a single package, such as the Edison™ or Galileo™ SoC boards from Intel® Corporation.

Additionally or alternatively, application circuitry XT05 may include circuitry such as, but not limited to, one or more field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XT05 may comprise logic blocks or logic fabric including other interconnected resources that may be programmed to perform various functions, such as the procedures, methods, functions, etc. of the various embodiments discussed herein. In such embodiments, the circuitry of application circuitry XT05 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in lookup-tables (LUTs) and the like.

The baseband circuitry XT10 may be implemented, for example, as a solder-down substrate including one or more integrated circuits, a single packaged integrated circuit soldered to a main circuit board or a multi-chip module containing two or more integrated circuits. Although not shown, baseband circuitry XT10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XT10 may include protocol processing circuitry with one or more instances of control circuitry (not shown) to provide control functions for the digital baseband circuitry and/or radio frequency circuitry (for example, the radio front end modules XT15).

The radio front end modules (RFEMs) XT15 may comprise a millimeter wave RFEM and one or more submillimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XT15. The RFEMs XT15 may incorporate both millimeter wave antennas and sub-millimeter wave antennas.

The memory circuitry XT20 may include any number and type of memory devices used to provide for a given amount of system memory. As examples, the memory circuitry XT20 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry XT20 may be developed in accordance with a Joint Electron Devices Engineering Council (JEDEC) low power double data rate (LPDDR)-based design, such as LPDDR2, LPDDR3, LPDDR4, or the like. Memory circuitry XT20 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry XT20 may be on-die memory or registers associated with the application circuitry XT05. To provide for persistent storage of information such as data, applications, operating systems and so forth, memory circuitry XT20 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform XT00 may incorporate the three-dimensional (3D) cross-point (XPOINT) memories from Intel® and Micron®.

Removable memory circuitry XT23 may include devices, circuitry, enclosures/housings, ports or receptacles, etc. used to coupled portable data storage devices with the platform XT00. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform XT00 may also include interface circuitry (not shown) that is used to connect external devices with the platform XT00. The external devices connected to the platform XT00 via the interface circuitry may include sensors XT21, such as accelerometers, level sensors, flow sensors, temperature sensors, pressure sensors, barometric pressure sensors, and the like. The interface circuitry may be used to connect the platform XT00 to electro-mechanical components (EMCs) XT22, which may allow platform XT00 to change its state, position, and/or orientation, or move or control a mechanism or system. The EMCs XT22 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform XT00 may be configured to operate one or more EMCs XT22 based on one or more captured events and/or instructions or control signals received from a service provider and/or various clients.

In some implementations, the interface circuitry may connect the platform XT00 with positioning circuitry XT45, which may be the same or similar as the positioning circuitry XS45 discussed with regard to FIG. 9.

In some implementations, the interface circuitry may connect the platform XT00 with near-field communication (NFC) circuitry XT40, which may include an NFC controller coupled with an antenna element and a processing device. The NFC circuitry XT40 may be configured to read electronic tags and/or connect with another NFC-enabled device.

The driver circuitry XT46 may include software and hardware elements that operate to control particular devices that are embedded in the platform XT00, attached to the platform XT00, or otherwise communicatively coupled with the platform XT00. The driver circuitry XT46 may include individual drivers allowing other components of the platform XT00 to interact or control various input/output (I/O) devices that may be present within, or connected to, the platform XT00. For example, driver circuitry XT46 may include a display driver to control and allow access to a display device, a touchscreen driver to control and allow access to a touchscreen interface of the platform XT00, sensor drivers to obtain sensor readings of sensors XT21 and control and allow access to sensors XT21, EMC drivers to obtain actuator positions of the EMCs XT22 and/or control and allow access to the EMCs XT22, a camera driver to control and allow access to an embedded image capture device, audio drivers to control and allow access to one or more audio devices.

The power management integrated circuitry (PMIC) XT25 (also referred to as "power management circuitry XT25") may manage power provided to various components of the platform XT00. In particular, with respect to the baseband circuitry XT10, the PMIC XT25 may control power-source selection, voltage scaling, battery charging, or DC-to-DC conversion. The PMIC XT25 may often be included when the platform XT00 is capable of being powered by a battery XT30, for example, when the device is included in a UE XQ01, XQ02, XR01.

In some embodiments, the PMIC XT25 may control, or otherwise be part of, various power saving mechanisms of the platform XT00. For example, if the platform XT00 is in an RRC_Connected state, where it is still connected to the RAN node as it expects to receive traffic shortly, then it may enter a state known as Discontinuous Reception Mode (DRX) after a period of inactivity. During this state, the platform XT00 may power down for brief intervals of time and thus save power. If there is no data traffic activity for an extended period of time, then the platform XT00 may transition off to an RRC_Idle state, where it disconnects from the network and does not perform operations such as channel quality feedback, handover, etc. The platform XT00 goes into a very low power state and it performs paging where again it periodically wakes up to listen to the network and then powers down again. The platform XT00 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery XT30 may power the platform XT00, although in some examples the platform XT00 may be mounted deployed in a fixed location, and may have a power supply coupled to an electrical grid. The battery XT30 may be a lithium ion battery, a metal-air battery, such as a zinc-air battery, an aluminum-air battery, a lithium-air battery, and the like. In some implementations, such as in V2X applications, the battery XT30 may be a typical lead-acid automotive battery.

In some implementations, the battery XT30 may be a "smart battery," which includes or is coupled with a Battery Management System (BMS) or battery monitoring integrated circuitry. The BMS may be included in the platform XT00 to track the state of charge (SoCh) of the battery XT30. The BMS may be used to monitor other parameters of the battery XT30 to provide failure predictions, such as the state of health (SoH) and the state of function (SoF) of the battery XT30. The BMS may communicate the information of the battery XT30 to the application circuitry XT05 or other components of the platform XT00. The BMS may also include an analog-to-digital (ADC) convertor that allows the application circuitry XT05 to directly monitor the voltage of the battery XT30 or the current flow from the battery XT30. The battery parameters may be used to determine actions that the platform XT00 may perform, such as transmission frequency, network operation, sensing frequency, and the like.

A power block, or other power supply coupled to an electrical grid may be coupled with the BMS to charge the battery XT30. In some examples, the power block XQ28 may be replaced with a wireless power receiver to obtain the power wirelessly, for example, through a loop antenna in the computer platform XT00. In these examples, a wireless battery charging circuit may be included in the BMS. The specific charging circuits chosen may depend on the size of the battery XT30, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform XT00 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among others.

Figure 11:
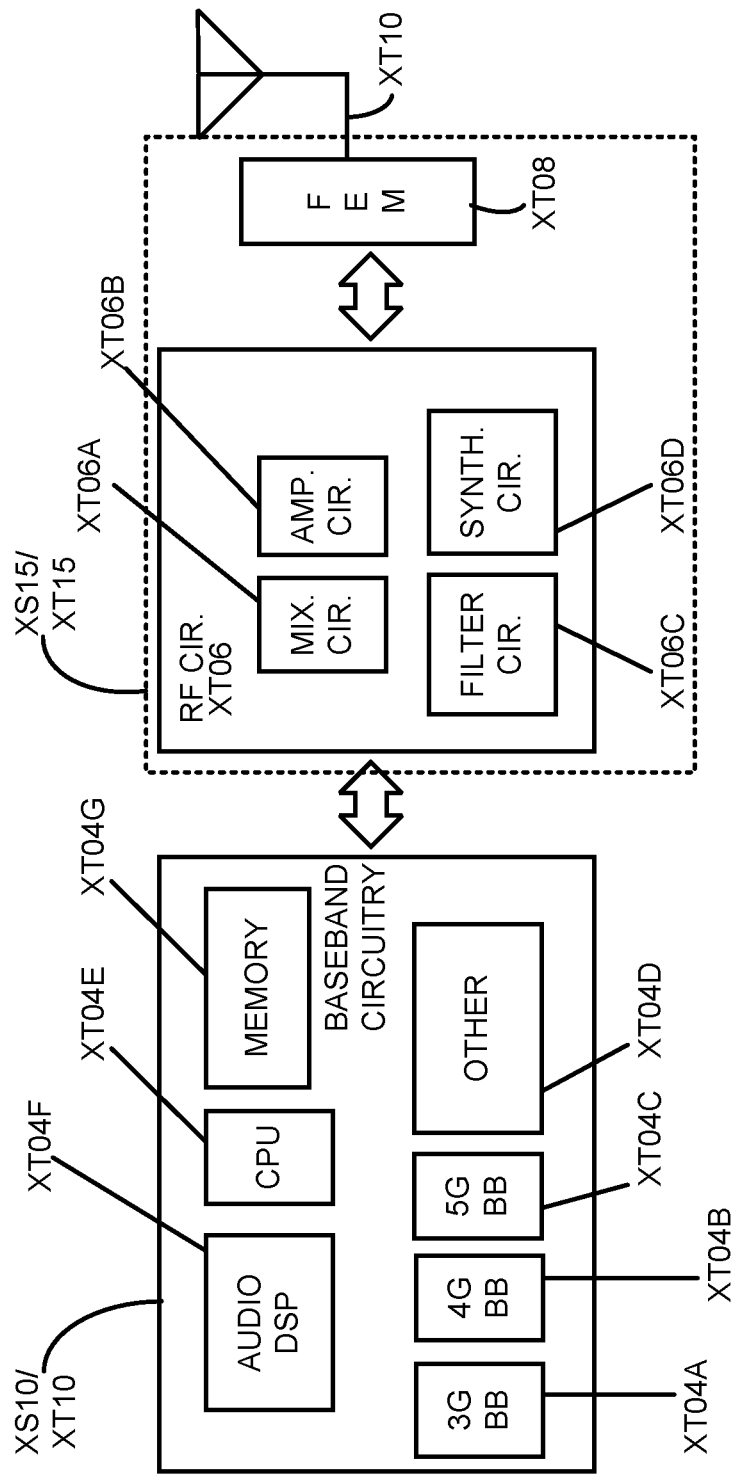
FIG. 11 illustrates example components of baseband circuitry and radio front end modules (RFEM) in accordance with some embodiments.

FIG. 11 illustrates example components of baseband circuitry XS10/XT10 and radio front end modules (RFEM) XS15/XT15 in accordance with some embodiments. As shown, the RFEM XS15/XT15 may include Radio Frequency (RF) circuitry XT06, front-end module (FEM) circuitry XT08, one or more antennas XT10 coupled together at least as shown.

The baseband circuitry XS10/XT10 may include circuitry such as, but not limited to, one or more single-core or multi-core processors. The baseband circuitry XS10/XT10 may include one or more baseband processors or control logic to process baseband signals received from a receive signal path of the RF circuitry XT06 and to generate baseband signals for a transmit signal path of the RF circuitry XT06. Baseband processing circuitry XS10/XT10 may interface with the application circuitry XS05/XT05 for generation and processing of the baseband signals and for controlling operations of the RF circuitry XT06. For example, in some embodiments, the baseband circuitry XS10/XT10 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XS10/XT10 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XS10/XT10 may include Fast-Fourier Transform (FFT), precoding, or constellation mapping/demapping functionality. In some embodiments, encoding/decoding circuitry of the baseband circuitry XS10/XT10 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XS10/XT10 may include one or more audio digital signal processor(s) (DSP) XT04F. The audio DSP(s) XT04F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry XS10/XT10 and the application circuitry XS05/XT05 may be implemented together such as, for example, on a system on a chip (SoC)

In some embodiments, the baseband circuitry XS10/XT10 may provide for communication compatible with one or more radio technologies. For example, in some embodiments, the baseband circuitry XS10/XT10 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry XS10/XT10 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XS10/XT10. RF circuitry XT06 may also include a transmit signal path which may include circuitry to up-convert baseband signals provided by the baseband circuitry XS10/XT10 and provide RF output signals to the FEM circuitry XT08 for transmission.

In some embodiments, the receive signal path of the RF circuitry XT06 may include mixer circuitry XT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT06b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XS10/XT10 for further processing. In some embodiments, the output baseband signals may be zero-frequency baseband signals, although this is not a requirement. In some embodiments, mixer circuitry XT06a of the receive signal path may comprise passive mixers, although the scope of the embodiments is not limited in this respect.

In some embodiments, the mixer circuitry XT06a of the transmit signal path may be configured to up-convert input baseband signals based on the synthesized frequency provided by the synthesizer circuitry XT06d to generate RF output signals for the FEM circuitry XT08. The baseband signals may be provided by the baseband circuitry XS10/XT10 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XS10/XT10 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XS10/XT10 or the applications processor XS05/XT05 depending on the desired output frequency. In some embodiments, a divider control input (e.g., N) may be determined from a look-up table based on a channel indicated by the applications processor XS05/XT05.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

Processors of the application circuitry XS05/XT05 and processors of the baseband circuitry XS10/XT10 may be used to execute elements of one or more instances of a protocol stack. For example, processors of the baseband circuitry XS10/XT10, alone or in combination, may be used execute Layer 3, Layer 2, or Layer 1 functionality, while processors of the baseband circuitry XS10/XT10 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
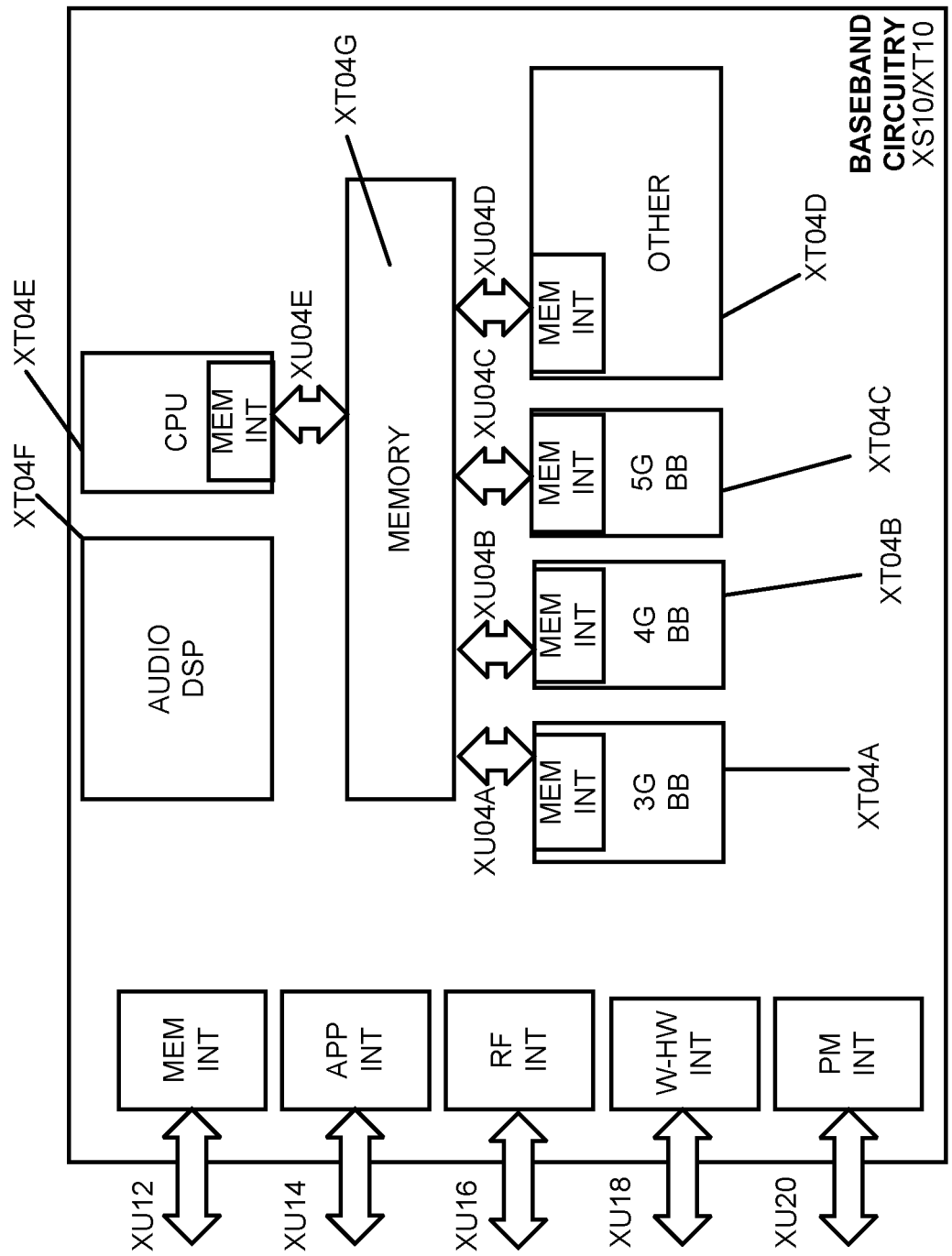
FIG. 12 illustrates example interfaces of baseband circuitry in accordance with some embodiments.

FIG. 12 illustrates example interfaces of baseband circuitry in accordance with some embodiments. As discussed above, the baseband circuitry XS10/XT10 of FIGS. XS-XT1 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XS10/XT10 may further include one or more interfaces to communicatively couple to other circuitries/devices, such as a memory interface XU12 (e.g., an interface to send/receive data to/from memory external to the baseband circuitry XS10/XT10), an application circuitry interface XU14 (e.g., an interface to send/receive data to/from the application circuitry XS05/XT05 of FIGS. XS-XT1), an RF circuitry interface XU16 (e.g., an interface to send/receive data to/from RF circuitry XT06 of FIG. 11), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMIC XT25.

Figure 13:
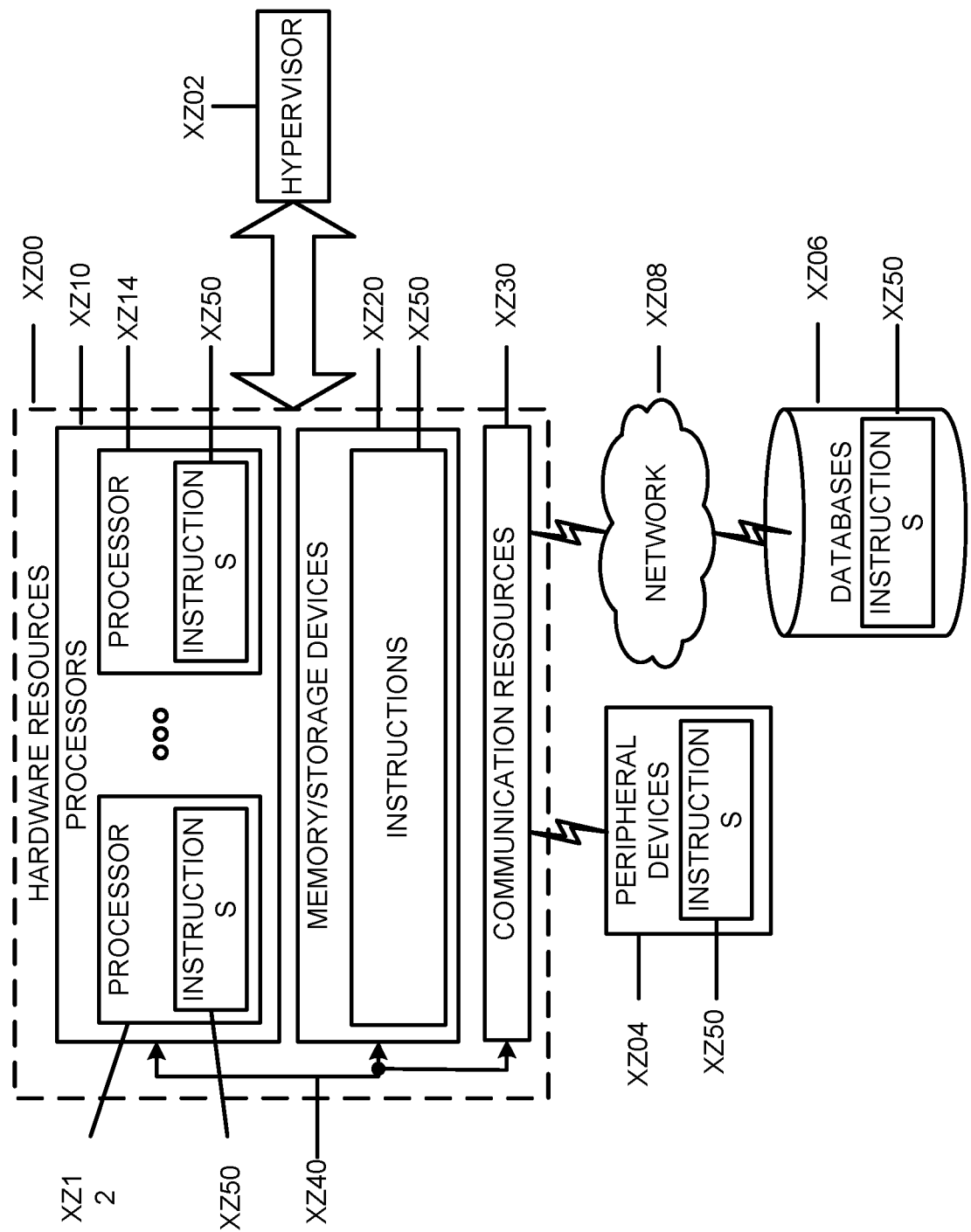
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor XZ02 may be executed to provide an execution environment for one or more network slices/sub-slices to utilize the hardware resources XZ00. A "virtualized resource" may refer to compute, storage, and/or network resources provided by virtualization infrastructure to an application, device, system, etc.

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES OF VARIOUS EMBODIMENTS

Example 1 includes a method to be performed by a base station in a cellular network, the method comprising: identifying, by the base station, whether a user equipment (UE) is to operate within the cellular network in accordance with a wideband (WB) protocol or a narrowband (NB) protocol; identifying, by the base station based on whether the UE is to operate in accordance with the WB protocol or the NB protocol, a number of resource blocks (RBs) that include subcarriers occupied by enhanced narrowband control channel elements (eNCCEs); and transmitting, by the base station, the eNCCEs on the subcarriers.

Example 2 includes the method of example 1, wherein the WB protocol and the NB protocol relate to NB Internet of Things (NB-IoT) operation within a cellular network.

Example 3 includes the method of example 1, wherein if the UE is to operate in accordance with the WB protocol, the number of RBs is greater than 1.

Example 4 includes the method of example 3, wherein a first group of subcarriers of a first RB include a first eNCCE, a second group of subcarriers of the first RB include a second eNCCE, and a third group of subcarriers of a second RB include a third eNCCE.

Example 5 includes the method of example 3, wherein the number of RBs is 6.

Example 6 includes the method of any of examples 1-5, further comprising transmitting, by the base station, a demodulation reference signal (DMRS) related to a narrowband physical downlink control channel (NPDCCH) on a narrowband reference signal (NRS) resource element (RE).

Example 7 includes the method of any of examples 1-5, wherein if the UE is to operate in accordance with the NB protocol, the number of RBs is 1.

Example 8 includes the method of example 7, further comprising transmitting, by the base station to the UE that is to operate in accordance with the NB protocol, a transmission related to an enhanced physical downlink control channel (ePDCCH) on subcarriers of a single physical resource block (PRB).

Example 9 includes the method of example 8, further comprising aggregating, by the base station, two enhanced control channel elements (eCCEs) of the ePDCCH to generate a single further eCCE (feCCE).

Example 10 includes the method of any of examples 1-5, wherein the NB protocol relates to cellular communication with a frequency bandwidth of one RB.

Example 11 includes the method of any of examples 1-5, wherein the WB protocol relates to cellular communication with a frequency bandwidth of greater than one RB.

Example 12 includes a method to be performed by a base station in a cellular network, the method comprising: identifying, by the base station, that a user equipment (UE) is to operate within the cellular network in accordance with a narrowband (NB) protocol; identifying, by the base station based on the identification that the UE is to operate in accordance with the NB protocol, a plurality of subcarriers within a single physical resource block (PRB) on which the base station is to transmit a transmission related to an enhanced physical downlink control channel (ePDCCH); and transmitting, by the base station to the UE, an indication of the plurality of subcarriers within the single PRB.

Example 13 includes the method of example 12, further comprising identifying, by the base station based on the identification that the UE is to operate in accordance with the NB protocol, a number of resource blocks (RBs) that include subcarriers occupied by enhanced narrowband control channel elements (eNCCEs).

Example 14 includes the method of example 13, wherein the number of RBs is 1.

Example 15 includes the method of example 13, further comprising transmitting, by the base station, the eNCCEs on the subcarriers of the RB.

Example 16 includes the method of any of examples 12-15, wherein the NB protocol relates to NB Internet of Things (NB-IoT) operation within the cellular network.

Example 17 includes the method of any of examples 12-15, further comprising transmitting, by the base station, the transmission related to the ePDCCH on the plurality of subcarriers within the single PRB.

Example 18 includes the method of any of examples 12-15, further comprising aggregating, by the base station, two enhanced control channel elements (eCCEs) of the ePDCCH to generate a single further eCCE (feCCE).

Example 19 includes the method of any of examples 12-15, wherein the NB protocol relates to cellular communication using a single resource block (RB).

Example 20 includes the method of any of examples 12-15, further comprising transmitting, by the base station, a demodulation reference signal (DMRS) related to a narrowband physical downlink control channel (NPDCCH) on a narrowband reference signal (NRS) resource element (RE).

Example 21 includes an apparatus to be used in a base station of a cellular network, wherein the apparatus comprises: means to identify whether a user equipment (UE) is to operate within the cellular network in accordance with a wideband (WB) protocol or a narrowband (NB) protocol; means to identify, based on whether the UE is to operate in accordance with the WB protocol or the NB protocol, a number of resource blocks (RBs) that include subcarriers occupied by enhanced narrowband control channel elements (eNCCEs); and means to transmit the eNCCEs on the subcarriers.

Example 22 includes the apparatus of example 21, wherein the WB protocol and the NB protocol relate to NB Internet of Things (NB-IoT) operation within a cellular network.

Example 23 includes the apparatus of example 21, wherein if the UE is to operate in accordance with the WB protocol, the number of RBs is greater than 1.

Example 24 includes the apparatus of example 23, wherein a first group of subcarriers of a first RB include a first eNCCE, a second group of subcarriers of the first RB include a second eNCCE, and a third group of subcarriers of a second RB include a third eNCCE.

Example 25 includes the apparatus of example 23, wherein the number of RBs is 6.

Example 26 includes the apparatus of any of examples 21-25, further comprising means to transmit a demodulation reference signal (DMRS) related to a narrowband physical downlink control channel (NPDCCH) on a narrowband reference signal (NRS) resource element (RE).

Example 27 includes the apparatus of any of examples 21-25, wherein if the UE is to operate in accordance with the NB protocol, the number of RBs is 1.

Example 28 includes the apparatus of example 27, further comprising means to transmit, to the UE that is to operate in accordance with the NB protocol, a transmission related to an enhanced physical downlink control channel (ePDCCH) on subcarriers of a single physical resource block (PRB).

Example 29 includes the apparatus of example 28, further comprising means to aggregate two enhanced control channel elements (eCCEs) of the ePDCCH to generate a single further eCCE (feCCE).

Example 30 includes the apparatus of any of examples 21-25, wherein the NB protocol relates to cellular communication with a frequency bandwidth of one RB.

Example 31 includes the apparatus of any of examples 21-25, wherein the WB protocol relates to cellular communication with a frequency bandwidth of greater than one RB.

Example 32 includes an apparatus to be used in a base station of a cellular network, wherein the apparatus comprises: means to identify that a user equipment (UE) is to operate within the cellular network in accordance with a narrowband (NB) protocol; means to identify, based on the identification that the UE is to operate in accordance with the NB protocol, a plurality of subcarriers within a single physical resource block (PRB) on which the base station is to transmit a transmission related to an enhanced physical downlink control channel (ePDCCH); and means to transmit, to the UE, an indication of the plurality of subcarriers within the single PRB.

Example 33 includes the apparatus of example 32, further comprising means to identify, based on the identification that the UE is to operate in accordance with the NB protocol, a number of resource blocks (RBs) that include subcarriers occupied by enhanced narrowband control channel elements (eNCCEs).

Example 34 includes the apparatus of example 33, wherein the number of RBs is 1.

Example 35 includes the apparatus of example 33, further comprising means to transmit the eNCCEs on the subcarriers of the RB.

Example 36 includes the apparatus of any of examples 32-35, wherein the NB protocol relates to NB Internet of Things (NB-IoT) operation within the cellular network.

Example 37 includes the apparatus of any of examples 32-35, further comprising means to transmit the transmission related to the ePDCCH on the plurality of subcarriers within the single PRB.

Example 38 includes the apparatus of any of examples 32-35, further comprising means to aggregate two enhanced control channel elements (eCCEs) of the ePDCCH to generate a single further eCCE (feCCE).

Example 39 includes the apparatus of any of examples 32-35, wherein the NB protocol relates to cellular communication using a single resource block (RB).

Example 40 includes the apparatus of any of examples 32-35, further comprising means to transmit a demodulation reference signal (DMRS) related to a narrowband physical downlink control channel (NPDCCH) on a narrowband reference signal (NRS) resource element (RE).

Example 41 includes one or more computer-readable media comprising instructions that, upon execution of the instructions by a processor of a base station in a cellular network, are to cause the base station to: identify whether a user equipment (UE) is to operate within the cellular network in accordance with a wideband (WB) protocol or a narrowband (NB) protocol; identify, based on whether the UE is to operate in accordance with the WB protocol or the NB protocol, a number of resource blocks (RBs) that include subcarriers occupied by enhanced narrowband control channel elements (eNCCEs); and transmit the eNCCEs on the subcarriers.

Example 42 includes the one or more computer-readable media of example 41, wherein the WB protocol and the NB protocol relate to NB Internet of Things (NB-IoT) operation within a cellular network.

Example 43 includes the one or more computer-readable media of example 41, wherein if the UE is to operate in accordance with the WB protocol, the number of RBs is greater than 1.

Example 44 includes the one or more computer-readable media of example 43, wherein a first group of subcarriers of a first RB include a first eNCCE, a second group of subcarriers of the first RB include a second eNCCE, and a third group of subcarriers of a second RB include a third eNCCE.

Example 45 includes the one or more computer-readable media of example 43, wherein the number of RBs is 6.

Example 46 includes the one or more computer-readable media of any of examples 41-45, wherein the instructions are further to transmit a demodulation reference signal (DMRS) related to a narrowband physical downlink control channel (NPDCCH) on a narrowband reference signal (NRS) resource element (RE).

Example 47 includes the one or more computer-readable media of any of examples 41-45, wherein if the UE is to operate in accordance with the NB protocol, the number of RBs is 1.

Example 48 includes the one or more computer-readable media of example 47, wherein the instructions are further to transmit, to the UE that is to operate in accordance with the NB protocol, a transmission related to an enhanced physical downlink control channel (ePDCCH) on subcarriers of a single physical resource block (PRB).

Example 49 includes the one or more computer-readable media of example 48, wherein the instructions are further to aggregate two enhanced control channel elements (eCCEs) of the ePDCCH to generate a single further eCCE (feCCE).

Example 50 includes the one or more computer-readable media of any of examples 41-45, wherein the NB protocol relates to cellular communication with a frequency bandwidth of one RB.

Example 51 includes the one or more computer-readable media of any of examples 41-45, wherein the WB protocol relates to cellular communication with a frequency bandwidth of greater than one RB.

Example 52 includes one or more computer-readable media comprising instructions that, upon execution of the instructions by a processor of a base station in a cellular network, are to cause the base station to: identify that a user equipment (UE) is to operate within the cellular network in accordance with a narrowband (NB) protocol; identify, based on the identification that the UE is to operate in accordance with the NB protocol, a plurality of subcarriers within a single physical resource block (PRB) on which the base station is to transmit a transmission related to an enhanced physical downlink control channel (ePDCCH); and transmit, to the UE, an indication of the plurality of subcarriers within the single PRB.

Example 53 includes the one or more computer-readable media of example 52, wherein the instructions are further to identify, based on the identification that the UE is to operate in accordance with the NB protocol, a number of resource blocks (RBs) that include subcarriers occupied by enhanced narrowband control channel elements (eNCCEs).

Example 54 includes the one or more computer-readable media of example 53, wherein the number of RBs is 1.

Example 55 includes the one or more computer-readable media of example 53, wherein the instructions are further to transmit the eNCCEs on the subcarriers of the RB.

Example 56 includes the one or more computer-readable media of any of examples 52-55, wherein the NB protocol relates to NB Internet of Things (NB-IoT) operation within the cellular network.

Example 57 includes the one or more computer-readable media of any of examples 52-55, wherein the instructions are further to transmit the transmission related to the ePDCCH on the plurality of subcarriers within the single PRB.

Example 58 includes the one or more computer-readable media of any of examples 52-55, wherein the instructions are further to aggregate two enhanced control channel elements (eCCEs) of the ePDCCH to generate a single further eCCE (feCCE).

Example 59 includes the one or more computer-readable media of any of examples 52-55, wherein the NB protocol relates to cellular communication using a single resource block (RB).

Example 60 includes the one or more computer-readable media of any of examples 52-55, wherein the instructions are further to transmit a demodulation reference signal (DMRS) related to a narrowband physical downlink control channel (NPDCCH) on a narrowband reference signal (NRS) resource element (RE).

Example 61 includes an apparatus for use in a base station of a cellular network, wherein the apparatus comprises: a processor to: identify whether a user equipment (UE) is to operate within the cellular network in accordance with a wideband (WB) protocol or a narrowband (NB) protocol; and identify, based on whether the UE is to operate in accordance with the WB protocol or the NB protocol, a number of resource blocks (RBs) that include subcarriers occupied by enhanced narrowband control channel elements (eNCCEs); and a radio frequency (RF) interface coupled with the processor, wherein the RF interface is to facilitate transmission, by the base station, of the eNCCEs on the subcarriers.

Example 62 includes the apparatus of example 61, wherein the WB protocol and the NB protocol relate to NB Internet of Things (NB-IoT) operation within a cellular network.

Example 63 includes the apparatus of example 61, wherein if the UE is to operate in accordance with the WB protocol, the number of RBs is greater than 1.

Example 64 includes the apparatus of example 63, wherein a first group of subcarriers of a first RB include a first eNCCE, a second group of subcarriers of the first RB include a second eNCCE, and a third group of subcarriers of a second RB include a third eNCCE.

Example 65 includes the apparatus of example 63, wherein the number of RBs is 6.

Example 66 includes the apparatus of any of examples 61-65, wherein the RF interface is further to facilitate transmission, by the base station, of a demodulation reference signal (DMRS) related to a narrowband physical downlink control channel (NPDCCH) on a narrowband reference signal (NRS) resource element (RE).

Example 67 includes the apparatus of any of examples 61-65, wherein if the UE is to operate in accordance with the NB protocol, the number of RBs is 1.

Example 68 includes the apparatus of example 67, wherein the RF interface is further to facilitate transmission, to the UE that is to operate in accordance with the NB protocol, of a transmission related to an enhanced physical downlink control channel (ePDCCH) on subcarriers of a single physical resource block (PRB).

Example 69 includes the apparatus of example 68, wherein the processor is further to aggregate two enhanced control channel elements (eCCEs) of the ePDCCH to generate a single further eCCE (feCCE).

Example 70 includes the apparatus of any of examples 61-65, wherein the NB protocol relates to cellular communication with a frequency bandwidth of one RB.

Example 71 includes the apparatus of any of examples 61-65, wherein the WB protocol relates to cellular communication with a frequency bandwidth of greater than one RB.

Example 72 includes an apparatus for use in a base station of a cellular network, wherein the apparatus comprises: a processor to: identify that a user equipment (UE) is to operate within the cellular network in accordance with a narrowband (NB) protocol; and identify, based on the identification that the UE is to operate in accordance with the NB protocol, a plurality of subcarriers within a single physical resource block (PRB) on which the base station is to transmit a transmission related to an enhanced physical downlink control channel (ePDCCH); and a radio frequency (RF) interface communicatively coupled with the processor, the RF interface to facilitate transmission, to the UE, of an indication of the plurality of subcarriers within the single PRB.

Example 73 includes the apparatus of example 72, wherein the processor is further to identify, based on the identification that the UE is to operate in accordance with the NB protocol, a number of resource blocks (RBs) that include subcarriers occupied by enhanced narrowband control channel elements (eNCCEs).

Example 74 includes the apparatus of example 73, wherein the number of RBs is 1.

Example 75 includes the apparatus of example 73, wherein the RF interface is further to facilitate transmission of the eNCCEs on the subcarriers of the RB.

Example 76 includes the apparatus of any of examples 72-75, wherein the NB protocol relates to NB Internet of Things (NB-IoT) operation within the cellular network.

Example 77 includes the apparatus of any of examples 72-75, wherein the RF interface is further to facilitate transmission of the transmission related to the ePDCCH on the plurality of subcarriers within the single PRB.

Example 78 includes the apparatus of any of examples 72-75, wherein the processor is further to aggregate two enhanced control channel elements (eCCEs) of the ePDCCH to generate a single further eCCE (feCCE).

Example 79 includes the apparatus of any of examples 72-75, wherein the NB protocol relates to cellular communication using a single resource block (RB).

Example 80 includes the apparatus of any of examples 72-75, wherein the RF interface is further to facilitate transmission of a demodulation reference signal (DMRS) related to a narrowband physical downlink control channel (NPDCCH) on a narrowband reference signal (NRS) resource element (RE).

Example 81 includes a method to be performed by a user equipment (UE) in a cellular network, the method comprising: identifying, by the UE, a transmission received from a base station; identifying, by the UE within the transmission, a number of resource block (RBs) that include subcarriers occupied by enhanced narrowband control channel elements (eNCCEs), wherein the number of resource blocks (RBs) is based on whether the UE is to operate within the cellular network in accordance with a wideband (WB) protocol or a narrowband (NB) protocol; and identifying, by the UE, the eNCCEs within the identified RBs.

Example 82 includes the method of example 81, wherein the WB protocol and the NB protocol relate to NB Internet of Things (NB-IoT) operation within a cellular network.

Example 83 includes the method of example 81, wherein if the UE is to operate in accordance with the WB protocol, the number of RBs is greater than 1.

Example 84 includes the method of example 83, wherein a first group of subcarriers of a first RB include a first eNCCE, a second group of subcarriers of the first RB include a second eNCCE, and a third group of subcarriers of a second RB include a third eNCCE.

Example 85 includes the method of example 83, wherein the number of RBs is 6.

Example 86 includes the method of any of examples 81-85, further comprising identifying, by the UE, a demodulation reference signal (DMRS) related to a narrowband physical downlink control channel (NPDCCH) on a narrowband reference signal (NRS) resource element (RE).

Example 87 includes the method of any of examples 81-85, wherein if the UE is to operate in accordance with the NB protocol, the number of RBs is 1.

Example 88 includes the method of example 87, further comprising identifying, by the UE from the base station, a transmission related to an enhanced physical downlink control channel (ePDCCH) on subcarriers of a single physical resource block (PRB), wherein the transmission is based on an identification, by the base station, that the UE is to operate within the cellular network in accordance with the NB protocol.

Example 89 includes the method of example 88, further comprising identifying, by the UE within a single further enhanced control channel element (feCCE) of the ePDCCH, two enhanced control channel elements (eCCEs) that were aggregated together to form the feCCE.

Example 90 includes the method of any of examples 81-85, wherein the NB protocol relates to cellular communication with a frequency bandwidth of one RB.

Example 91 includes the method of any of examples 81-85, wherein the WB protocol relates to cellular communication with a frequency bandwidth of greater than one RB.

Example 92 includes a method to be performed by a user equipment (UE) that is to operate in accordance with a narrowband (NB) protocol within a cellular network, the method comprising: identifying, by the UE based on a transmission received from a base station, an indication of a plurality of subcarriers within a single physical resource block (PRB); and identifying, by the UE based on the indication, a transmission related to an enhanced physical downlink control channel (ePDCCH) on the plurality of subcarriers.

Example 93 includes the method of example 92, wherein the plurality of subcarriers within the single PRB is based on an identification, by the base station, that the UE is to operate in accordance with the NB protocol.

Example 94 includes the method of examples 92 or 93, wherein the NB protocol relates to NB Internet of Things (NB-IoT) operation within the cellular network.

Example 95 includes the method of examples 92 or 93, wherein the transmission includes a further enhanced control channel element (feCCE) that is based on aggregation, by the base station, of two enhanced control channel elements (eCCEs).

Example 96 includes the method of examples 92 or 93, wherein the NB protocol relates to cellular communication using a single resource block (RB).

Example 97 includes the method of examples 92 or 93, further comprising identifying, by the UE in a narrowband reference signal (NRS) resource element (RE), a demodulation reference signal (DMRS) related to a narrowband physical downlink control channel (NPDCCH).

Example 98 includes an apparatus to be used in a user equipment (UE) in a cellular network, wherein the apparatus comprises: means to identify a transmission received from a base station; means to identify, within the transmission, a number of resource block (RBs) that include subcarriers occupied by enhanced narrowband control channel elements (eNCCEs), wherein the number of resource blocks (RBs) is based on whether the UE is to operate within the cellular network in accordance with a wideband (WB) protocol or a narrowband (NB) protocol; and means to identify the eNCCEs within the identified RBs.

Example 99 includes the apparatus of example 98, wherein the WB protocol and the NB protocol relate to NB Internet of Things (NB-IoT) operation within a cellular network.

Example 100 includes the apparatus of example 98, wherein if the UE is to operate in accordance with the WB protocol, the number of RBs is greater than 1.

Example 101 includes the apparatus of example 100, wherein a first group of subcarriers of a first RB include a first eNCCE, a second group of subcarriers of the first RB include a second eNCCE, and a third group of subcarriers of a second RB include a third eNCCE.

Example 102 includes the apparatus of example 100, wherein the number of RBs is 6.

Example 103 includes the apparatus of any of examples 98-102, further comprising means to identify a demodulation reference signal (DMRS) related to a narrowband physical downlink control channel (NPDCCH) on a narrowband reference signal (NRS) resource element (RE).

Example 104 includes the apparatus of any of examples 98-102, wherein if the UE is to operate in accordance with the NB protocol, the number of RBs is 1.

Example 105 includes the apparatus of example 104, further comprising means to identify, from the base station, a transmission related to an enhanced physical downlink control channel (ePDCCH) on subcarriers of a single physical resource block (PRB), wherein the transmission is based on an identification, by the base station, that the UE is to operate within the cellular network in accordance with the NB protocol.

Example 106 includes the apparatus of example 105, further comprising means to identify, within a single further enhanced control channel element (feCCE) of the ePDCCH, two enhanced control channel elements (eCCEs) that were aggregated together to form the feCCE.

Example 107 includes the apparatus of any of examples 98-102, wherein the NB protocol relates to cellular communication with a frequency bandwidth of one RB.

Example 108 includes the apparatus of any of examples 98-102, wherein the WB protocol relates to cellular communication with a frequency bandwidth of greater than one RB.

Example 109 includes an apparatus to be used in a user equipment (UE) that is to operate in accordance with a narrowband (NB) protocol within a cellular network, wherein the apparatus comprises: means to identify, based on a transmission received from a base station, an indication of a plurality of subcarriers within a single physical resource block (PRB); and means to identify, based on the indication, a transmission related to an enhanced physical downlink control channel (ePDCCH) on the plurality of subcarriers.

Example 110 includes the apparatus of example 109, wherein the plurality of subcarriers within the single PRB is based on an identification, by the base station, that the UE is to operate in accordance with the NB protocol.

Example 111 includes the apparatus of examples 109 or 110, wherein the NB protocol relates to NB Internet of Things (NB-IoT) operation within the cellular network.

Example 112 includes the apparatus of examples 109 or 110, wherein the transmission includes a further enhanced control channel element (feCCE) that is based on aggregation, by the base station, of two enhanced control channel elements (eCCEs).

Example 113 includes the apparatus of examples 109 or 110, wherein the NB protocol relates to cellular communication using a single resource block (RB).

Example 114 includes the apparatus of examples 109 or 110, further comprising means to identify, in a narrowband reference signal (NRS) resource element (RE), a demodulation reference signal (DMRS) related to a narrowband physical downlink control channel (NPDCCH).

Example 115 includes one or more computer-readable media comprising instructions that, upon execution of the instructions by a processor of a user equipment (UE) in a cellular network, are to cause the UE to: identify a transmission received from a base station; identify, within the transmission, a number of resource block (RBs) that include subcarriers occupied by enhanced narrowband control channel elements (eNCCEs), wherein the number of resource blocks (RBs) is based on whether the UE is to operate within the cellular network in accordance with a wideband (WB) protocol or a narrowband (NB) protocol; and identify the eNCCEs within the identified RBs.

Example 116 includes the one or more computer-readable media of example 115, wherein the WB protocol and the NB protocol relate to NB Internet of Things (NB-IoT) operation within a cellular network.

Example 117 includes the one or more computer-readable media of example 115, wherein if the UE is to operate in accordance with the WB protocol, the number of RBs is greater than 1.

Example 118 includes the one or more computer-readable media of example 117, wherein a first group of subcarriers of a first RB include a first eNCCE, a second group of subcarriers of the first RB include a second eNCCE, and a third group of subcarriers of a second RB include a third eNCCE.

Example 119 includes the one or more computer-readable media of example 117, wherein the number of RBs is 6.

Example 120 includes the one or more computer-readable media of any of examples 115-119, wherein the instructions are further to identify a demodulation reference signal (DMRS) related to a narrowband physical downlink control channel (NPDCCH) on a narrowband reference signal (NRS) resource element (RE).

Example 121 includes the one or more computer-readable media of any of examples 115-119, wherein if the UE is to operate in accordance with the NB protocol, the number of RBs is 1.

Example 122 includes the one or more computer-readable media of example 121, wherein the instructions are further to identify, from the base station, a transmission related to an enhanced physical downlink control channel (ePDCCH) on subcarriers of a single physical resource block (PRB), wherein the transmission is based on an identification, by the base station, that the UE is to operate within the cellular network in accordance with the NB protocol.

Example 123 includes the one or more computer-readable media of example 122, wherein the instructions are further to identify, within a single further enhanced control channel element (feCCE) of the ePDCCH, two enhanced control channel elements (eCCEs) that were aggregated together to form the feCCE.

Example 124 includes the one or more computer-readable media of any of examples 115-119, wherein the NB protocol relates to cellular communication with a frequency bandwidth of one RB.

Example 125 includes the one or more computer-readable media of any of examples 115-119, wherein the WB protocol relates to cellular communication with a frequency bandwidth of greater than one RB.

Example 126 includes one or more non-transitory computer-readable media comprising instructions that, upon execution of the instructions by a processor of a user equipment (UE) that is to operate in accordance with a narrowband (NB) protocol within a cellular network, are to cause the UE to: identify, based on a transmission received from a base station, an indication of a plurality of subcarriers within a single physical resource block (PRB); and identify, based on the indication, a transmission related to an enhanced physical downlink control channel (ePDCCH) on the plurality of subcarriers.

Example 127 includes the one or more computer-readable media of example 126, wherein the plurality of subcarriers within the single PRB is based on an identification, by the base station, that the UE is to operate in accordance with the NB protocol.

Example 128 includes the one or more computer-readable media of examples 126 or 127, wherein the NB protocol relates to NB Internet of Things (NB-IoT) operation within the cellular network.

Example 129 includes the one or more computer-readable media of examples 126 or 127, wherein the transmission includes a further enhanced control channel element (feCCE) that is based on aggregation, by the base station, of two enhanced control channel elements (eCCEs).

Example 130 includes the one or more computer-readable media of examples 126 or 127, wherein the NB protocol relates to cellular communication using a single resource block (RB).

Example 131 includes the one or more computer-readable media of examples 126 or 127, wherein the instructions are further to identify, in a narrowband reference signal (NRS) resource element (RE), a demodulation reference signal (DMRS) related to a narrowband physical downlink control channel (NPDCCH).

Example 132 includes an apparatus to be used in a user equipment (UE) in a cellular network, wherein the apparatus comprises: a radio frequency (RF) interface to receive a transmission received from a base station; and a processor coupled with the RF interface, the processor to: identify, within the transmission, a number of resource block (RBs) that include subcarriers occupied by enhanced narrowband control channel elements (eNCCEs), wherein the number of resource blocks (RBs) is based on whether the UE is to operate within the cellular network in accordance with a wideband (WB) protocol or a narrowband (NB) protocol; and identify the eNCCEs within the identified RBs.

Example 133 includes the apparatus of example 132, wherein the WB protocol and the NB protocol relate to NB Internet of Things (NB-IoT) operation within a cellular network.

Example 134 includes the apparatus of example 132, wherein if the UE is to operate in accordance with the WB protocol, the number of RBs is greater than 1.

Example 135 includes the apparatus of example 134, wherein a first group of subcarriers of a first RB include a first eNCCE, a second group of subcarriers of the first RB include a second eNCCE, and a third group of subcarriers of a second RB include a third eNCCE.

Example 136 includes the apparatus of example 134, wherein the number of RBs is 6.

Example 137 includes the apparatus of any of examples 132-136, wherein the RF interface is further to receive a demodulation reference signal (DMRS) related to a narrowband physical downlink control channel (NPDCCH) on a narrowband reference signal (NRS) resource element (RE).

Example 138 includes the apparatus of any of examples 132-136, wherein if the UE is to operate in accordance with the NB protocol, the number of RBs is 1.

Example 139 includes the apparatus of example 138, wherein the RF interface is further to receive a transmission related to an enhanced physical downlink control channel (ePDCCH) on subcarriers of a single physical resource block (PRB), wherein the transmission is based on an identification, by the base station, that the UE is to operate within the cellular network in accordance with the NB protocol.

Example 140 includes the apparatus of example 139, wherein the processor is further to identify, within a single further enhanced control channel element (feCCE) of the ePDCCH, two enhanced control channel elements (eCCEs) that were aggregated together to form the feCCE.

Example 141 includes the apparatus of any of examples 132-136, wherein the NB protocol relates to cellular communication with a frequency bandwidth of one RB.

Example 142 includes the apparatus of any of examples 132-136, wherein the WB protocol relates to cellular communication with a frequency bandwidth of greater than one RB.

Example 143 includes an apparatus to be used in a user equipment (UE) that is to operate in accordance with a narrowband (NB) protocol within a cellular network, wherein the apparatus comprises: a radio frequency (RF) interface to receive a transmission from a base station; and a processor coupled with the RF interface, wherein the processor is to: identify, based on the transmission, an indication of a plurality of subcarriers within a single physical resource block (PRB); and identify, based on the indication, a transmission related to an enhanced physical downlink control channel (ePDCCH) on the plurality of subcarriers.

Example 144 includes the apparatus of example 143, wherein the plurality of subcarriers within the single PRB is based on an identification, by the base station, that the UE is to operate in accordance with the NB protocol.

Example 145 includes the apparatus of examples 143 or 144, wherein the NB protocol relates to NB Internet of Things (NB-IoT) operation within the cellular network.

Example 146 includes the apparatus of examples 143 or 144, wherein the transmission includes a further enhanced control channel element (feCCE) that is based on aggregation, by the base station, of two enhanced control channel elements (eCCEs).

Example 147 includes the apparatus of examples 143 or 144, wherein the NB protocol relates to cellular communication using a single resource block (RB).

Example 148 includes the apparatus of examples 143 or 144, wherein the RF interface is further to receive, from the base station, a narrowband reference signal (NRS) resource element (RE); and the processor is further to identify, in the NRS RE, a demodulation reference signal (DMRS) related to a narrowband physical downlink control channel (NPDCCH).

Example 149 includes a NB-IoT system to utilize a downlink control channel structure wherein the downlink control channel structure comprises one or more NCCEs.

Example 150 includes the NB-IoT system of example 149 and/or any other examples herein, wherein the one or more NCCEs are within one resource block (RB).

Example 151 includes a DCI design and corresponding search space design for NB-IoT operating in unlicensed spectrum ("NB-IoT unlicensed").

Example 152 includes the subject matter of example 151 and/or some other examples herein, wherein unlicensed NB-IoT reuse the legacy DCI format NI, and the corresponding search space.

Example 153 includes the subject matter of example 151 and/or some other examples herein, wherein the maximum DCI repetition times Rmax for Unicasted PDSCH scheduling is reduced to: r1, r2, r4, r8, r16, r32, r64; r1, r2, r4, r8, r16, r32, r64, r128; r1, r2, r4, r8, r16, r32, r64, r128, r256; or r1, r2, r4, r8, r16, r32, r64, r128, r256, r512.

Example 154 includes the subject matter of example 151 and/or some other examples herein, wherein the legacy larger repetition times is not needed, such as: r128, r256, r512, r1024, r2048.

Example 155 includes the subject matter of example 151 and/or some other examples herein, wherein the unlicensed NB-IOT reuse the legacy DCI format N2 for Type 1 CSS, and the corresponding search space.

Example 156 includes the subject matter of example 151 and/or some other examples herein, wherein the maximum DCI repetition times Rmax for paging scheduling, pdcchNumRepetitionPaging is reduced to: r1, r2, r4, r8, r16, r32, r64; r1, r2, r4, r8, r16, r32, r64, r128; r1, r2, r4, r8, r16, r32, r64, r128, r256; or r1, r2, r4, r8, r16, r32, r64, r128, r256, r512.

Example 157 includes the subject matter of example 151 and/or some other examples herein, wherein the legacy larger repetition times is not needed, such as: r128, r256, r512, r1024, r2048.

Example 158 includes the subject matter of example 151 and/or some other examples herein, wherein the search space of Type I CSS is as illustrated in Table 3.

Example 159 includes the subject matter of example 151 and/or some other examples herein, wherein the search space of Type 1 CSS is as illustrated in Table 4.

Example 160 includes the subject matter of example 151 and/or some other examples herein, wherein unlicensed NB-IOT reuse the legacy DCI format N2 for Type1 CSS, and the corresponding search space.

Example 161 includes the subject matter of example 151 and/or some other examples herein, wherein the maximum DCI repetition times Rmax for RA, npdcch-NumRepetitions-RA is reduced to: r1, r2, r4, r8, r16, r32, r64; r1, r2, r4, r8, r16, r32, r64, r128; r1, r2, r4, r8, r16, r32, r64, r128, r256; or r1, r2, r4, r8, r16, r32, r64, r128, r256, r512.

Example 162 includes the subject matter of example 151 and/or some other examples herein, wherein the legacy larger repetition times is not needed, such as: r128, r256, r512, r1024, r2048.

Example 163 includes the subject matter of example 151 and/or some other examples herein, wherein reuse the legacy DCI format N0 for PUSCH scheduling, and corresponding search space.

Example 164 includes the subject matter of example 151 and/or some other examples herein, wherein the reserved subcarrier indication can be interpreted as the explicit ACK of PUSCH. After receiving this explicit HARQ, UE will flush the buffer.

Example 165 includes the subject matter of example 151 and/or some other examples herein, wherein additional reserved subcarrier indication can be interpreted as explicit ACK for early termination of PUSCH transmission. After UE receives the explicit ACK, it will flush the buffer.

Example 166 includes the subject matter of example 151 and/or some other examples herein, wherein the larger repetition times of PUSCH is reserved, e.g. 64, 128. While the reserved states of repetition number can be utilized as the explicit ACK indication for early termination of MDCCH and/or early termination of PUSCH transmission.

Example 167 includes the subject matter of example 151 and/or some other examples herein, wherein the reserved stat of modulation and coding schemes can be utilized as the explicit ACK indication for early termination of MDCCH and/or early termination of PUSCH transmission.

Example 168 includes the subject matter of example 151 and/or some other examples herein, wherein if one HARQ is supported by UE, then one state is needed.

Example 169 includes the subject matter of example 151 and/or some other examples herein, wherein if two HARQ-ProcessesConfig is configured, three states is needed comprising: a first state for ACK of HARQ 1; a second state for ACK of HARQ 2; and a third state for ACK of both HARQ 1 and HARQ 2.

Example 170 includes an apparatus comprising means to perform one or more elements of a method or process described in or related to any of examples 1-169, or portions or parts thereof.

Example 171 may include one or more non-transitory computer-readable media comprising instructions to cause an electronic device, upon execution of the instructions by one or more processors of the electronic device, to perform one or more elements of a method or process described in or related to any of examples 1-169, or portions or parts thereof.

Example 172 may include an apparatus comprising logic, modules, or circuitry to perform one or more elements of a method or process described in or related to any of examples 1-169, or portions or parts thereof.

Example 173 may include a method, technique, or process as described in or related to any of examples 1-169, or portions or parts thereof.

Example 174 may include an apparatus comprising: one or more processors and one or more computer readable media comprising instructions that, when executed by the one or more processors, cause the one or more processors to one or more elements of a method or process described in or related to any of examples 1-169, or portions or parts thereof.

Example 175 may include a signal as described in or related to any of examples 1-169, or portions or parts thereof.

Example 176 may include a signal in a wireless network as shown and described herein.

Example 177 may include a method of communicating in a wireless network as shown and described herein.

Example 178 may include a system for providing wireless communication as shown and described herein.

Example 179 may include a device for providing wireless communication as shown and described herein.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations of the various embodiments, including what is described in the Abstract, is not intended to be exhaustive or to limit the invention to the precise forms disclosed. While specific implementations of, and examples for, various embodiments are described herein for illustrative purposes, various equivalent modifications are possible within the scope of the invention, as those skilled in the relevant art will recognize. These modifications may be made in light of the above detailed description. The terms used in the following claims should not be construed to limit this disclosure to the specific embodiments disclosed in the specification and the claims.

The invention claimed is:

1. An apparatus to be used in a base station of a cellular network, wherein the apparatus comprises:
   means to identify whether a user equipment (UE) is to operate within the cellular network in accordance with a narrowband (NB) protocol or a wideband (WB) protocol;
   means to identify, based on the identification that the UE is to operate in accordance with the NB protocol, a plurality of subcarriers within a single physical resource block (PRB) on which the base station is to transmit a transmission related to an enhanced physical downlink control channel (ePDCCH);
   means to aggregate two enhanced control channel elements (eCCEs) of the ePDCCH to generate a single further eCCE (feCCE), wherein the feCCE has DMRS that are orthogonal to DMRS of another feCCE of the ePDCCH;
   means to transmit an indication of the plurality of subcarriers within the single PRB; and
   means to transmit the transmission related to the ePDCCH on the plurality of subcarriers within the single PRB.

2. The apparatus of claim 1, further comprising means to identify, based on the identification that the UE is to operate in accordance with the NB protocol, a number of resource blocks (RBs) that include subcarriers occupied by enhanced narrowband control channel elements (eNCCEs).

3. The apparatus of claim 1, wherein the NB protocol relates to NB Internet of Things (NB-IoT) operation within the cellular network.

4. The apparatus of claim 1, further comprising means to transmit the transmission related to the ePDCCH on the plurality of subcarriers within the single PRB.

5. The apparatus of claim 1, wherein the NB protocol relates to cellular communication using a single resource block (RB).

6. The apparatus of claim 1, further comprising means to transmit a demodulation reference signal (DMRS) related to a narrowband physical downlink control channel (NPDCCH) on a narrowband reference signal (NRS) resource element (RE).

7. An apparatus for a user equipment (UE), wherein the apparatus comprises:
   a radio frequency (RF) interface to cause reception, by the UE, of a transmission from a base station; and
   a processor coupled with the RF interface, configured to:
      identify that the UE is to operate in accordance with a narrowband (NB) protocol within a cellular network;
      identify, based on the transmission received from the base station, an indication of a plurality of subcarriers within a single physical resource block (PRB); and
      identify, based on the indication, a transmission related to an enhanced physical downlink control channel (ePDCCH) on the plurality of subcarriers;
      wherein the transmission includes a further enhanced control channel element (feCCE) that is based on aggregation, by the base station, of two enhanced control channel elements (eCCEs), wherein the feCCE has DMRS that are orthogonal to DMRS of another feCCE of the ePDCCH.

8. The apparatus of claim 7, wherein the plurality of subcarriers within the single PRB is based on an identification, by the base station, that the UE is to operate in accordance with the NB protocol.

9. The apparatus of claim 7, wherein the NB protocol relates to NB Internet of Things (NB-IoT) operation within the cellular network.

10. The apparatus of claim 7, wherein the NB protocol relates to cellular communication using a single resource block (RB).

11. The apparatus of claim 7, wherein the processor is configured to identify, in a narrowband reference signal (NRS) resource element (RE), a demodulation reference signal (DMRS) related to a narrowband physical downlink control channel (NPDCCH).

12. A method for a user equipment (UE), comprising:
   identifying that the UE is to operate in accordance with a narrowband (NB) protocol within a cellular network;
   receiving a first transmission from a base station;
   identifying, based on the first transmission received from a base station, an indication of a plurality of subcarriers within a single physical resource block (PRB); and
   identifying, based on the indication, a second transmission related to an enhanced physical downlink control channel (ePDCCH) on the plurality of subcarriers;
   wherein the transmission includes a further enhanced control channel element (feCCE) that is based on aggregation, by the base station, of two enhanced control channel elements (eCCEs), wherein the feCCE has DMRS that are orthogonal to DMRS of another feCCE of the ePDCCH.

13. The method of claim 12, wherein the plurality of subcarriers within the single PRB is based on an identification, by the base station, that the UE is to operate in accordance with the NB protocol.

14. The method of claim 12, wherein the NB protocol relates to NB Internet of Things (NB-IoT) operation within the cellular network.

15. The method of claim 12, wherein the NB protocol relates to cellular communication using a single resource block (RB).

16. The method of claim 12, further comprising identifying, in a narrowband reference signal (NRS) resource element (RE), a demodulation reference signal (DMRS) related to a narrowband physical downlink control channel (NPDCCH).

* * * * *